(12) United States Patent
Rentschler et al.

(10) Patent No.: US 9,037,911 B2
(45) Date of Patent: May 19, 2015

(54) DEBUG STATE MACHINES AND METHODS OF THEIR OPERATION

(75) Inventors: Eric M. Rentschler, Steamboat Springs, CO (US); Steven J. Kommrusch, Fort Collins, CO (US); Scott Nixon, Fort Collins, CO (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 282 days.

(21) Appl. No.: 13/095,627

(22) Filed: Apr. 27, 2011

(65) Prior Publication Data

US 2012/0151263 A1    Jun. 14, 2012

Related U.S. Application Data

(60) Provisional application No. 61/421,501, filed on Dec. 9, 2010.

(51) Int. Cl.
*G06F 11/00* (2006.01)
*G06F 11/267* (2006.01)
*G06F 11/22* (2006.01)

(52) U.S. Cl.
CPC .............. *G06F 11/267* (2013.01); *G06F 11/22* (2013.01)

(58) Field of Classification Search
CPC ........................ G06F 11/22–11/2242

USPC ............................................................ 714/34
See application file for complete search history.

(56) References Cited

U.S. PATENT DOCUMENTS

| | | | |
|---|---|---|---|
| 6,374,370 B1 * | 4/2002 | Bockhaus et al. .............. 714/39 |
| 6,557,119 B1 * | 4/2003 | Edwards et al. ........... 714/38.12 |
| 6,996,747 B2 * | 2/2006 | Swoboda et al. ............... 714/30 |
| 2002/0087918 A1 * | 7/2002 | Miura et al. .................... 714/38 |
| 2002/0194543 A1 * | 12/2002 | Veenstra et al. ................ 714/39 |
| 2004/0153838 A1 * | 8/2004 | Swanson et al. ................ 714/39 |
| 2008/0313503 A1 * | 12/2008 | Zhu et al. ........................ 714/45 |
| 2009/0150725 A1 * | 6/2009 | Vorbach .......................... 714/37 |

* cited by examiner

*Primary Examiner* — Michael Maskulinski
(74) *Attorney, Agent, or Firm* — Park, Vaughan, Fleming & Dowler, LLP

(57) ABSTRACT

Embodiments include methods for performing various operations in a computing system that includes an electronic module and a debug circuit. The method includes programming the debug circuit to monitor for pre-selected triggers produced by the computing system, and to perform actions in response to detecting the pre-select triggers. For example, in response to various pre-selected triggers, the debug circuit may, among other things: perform state transitions and log information indicating whether or not the state transitions were performed; monitor various signals when the debug circuit has determined that a test escape has occurred; and/or perform one or more actions that initiate stopping one or more clocks in response to certain pre-selected triggers.

19 Claims, 11 Drawing Sheets

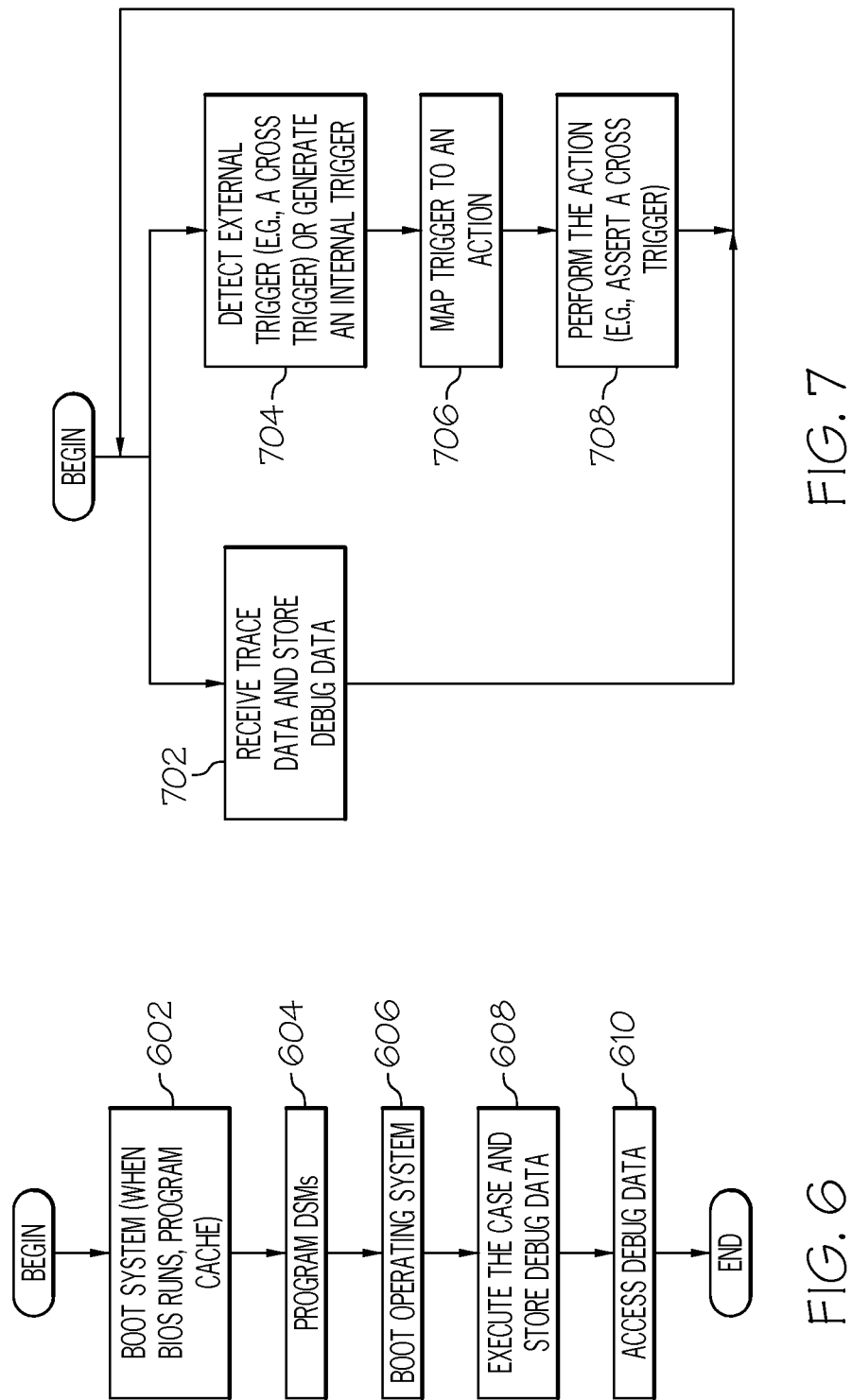

DEBUG STATE MACHINES AND METHODS OF THEIR OPERATION

RELATED APPLICATION

This application claims priority to a provisional application having Ser. No. 61/421,501, which was filed on Dec. 9, 2010.

TECHNICAL FIELD

Embodiments of the subject matter described herein relate generally to electronic circuits, and more particularly, relate to electronic circuits and debug operations performed thereon.

BACKGROUND

In any back-end, integrated circuit (IC) development process, it is desirable to ensure that the hardware works correctly in the expected operating space before the IC is shipped in volume. The challenge is to do a thorough job so that ICs are not deployed in the field, and then significant problems are subsequently discovered (e.g., by an original equipment manufacturer (OEM)). However, this is not always possible. One reason is that insufficient time may be available for cycling the hardware through every possible state and situation. Another reason is that certain aspects of the hardware and state machine functionality are opaque (i.e., not observable).

Some prior systems implemented extremely targeted hardware elements buried deep within a processor core to pipe out functional signatures that characterize occurrences within the core, thus making certain aspects of core functioning externally visible outside a chip. However, when dense content is executed (e.g., by shortening up test vectors), the effects of certain failures may never become visible at the pin boundary of the chip unless execution is continued for a sufficiently long period of time. Accordingly, such failures may remain undetected.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 6 is a flow diagram of a method for setting up and conducting debug operations, in accordance with an embodiment;

FIG. 7 is a flow diagram of a method for operating debug circuitry in the context of a debug operation, in accordance with an embodiment;

DETAILED DESCRIPTION

Figure 1:
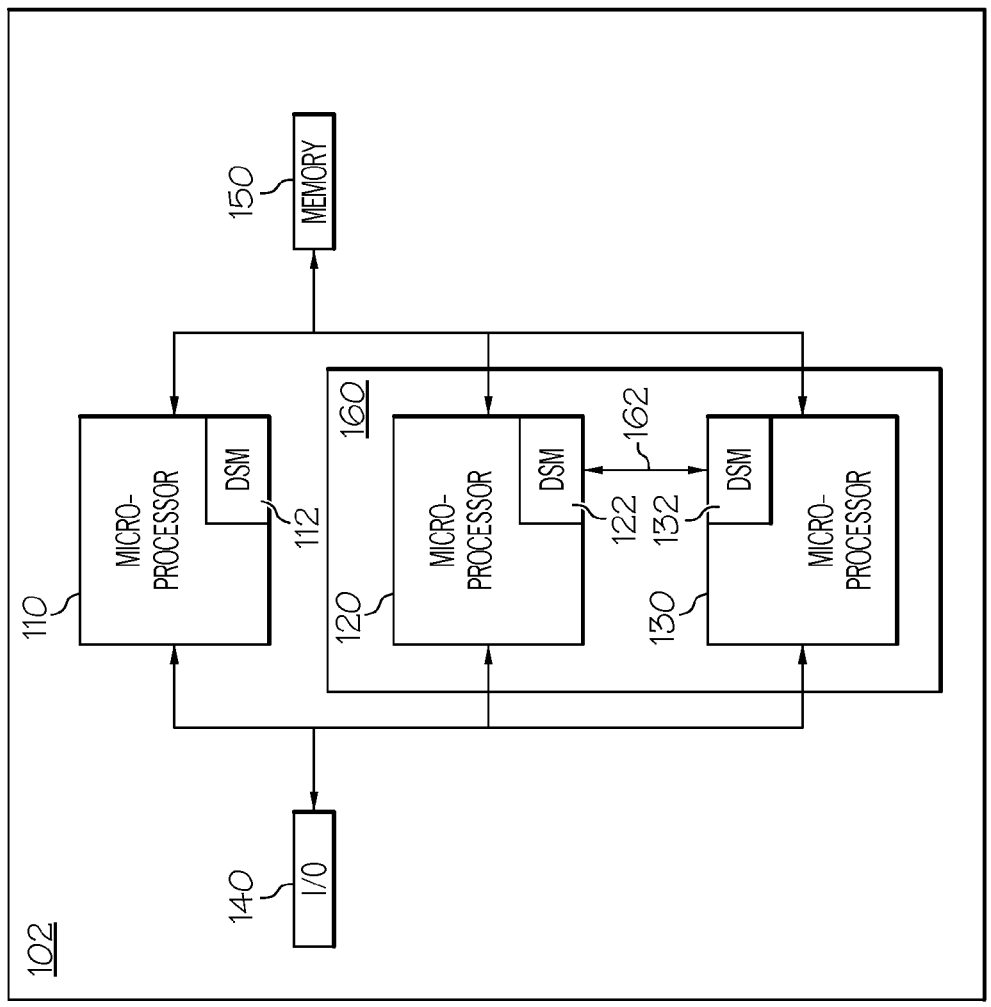
FIG. 1 is a block diagram of a computing system, in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Technologies and concepts discussed herein relate to debug techniques implemented using debug circuits, referred to herein as debug state machines (DSMs), which may be integrated with multiple electronic modules of an integrated circuit. For example, a distinct DSM may be integrated with each of multiple cores of a multiple-core central processing unit (CPU), as well as being integrated with other electronic modules of the CPU (e.g., a Northbridge, a Southbridge, a Graphics Processing Unit (GPU), a special purpose processor, other types of processors, and so on), in an embodiment. Embodiments also include apparatus and methods that facilitate inter-communications between distinct DSMs within a single integrated circuit, between DSMs of multiple integrated circuits of a multi-chip module (MCM), and between DSMs of multiple packaged devices (e.g., DSM inter-communications from socket-to-socket). This inter-communication is referred to herein as "cross triggering."

DSMs may provide significant visibility to what is occurring in the electronic modules with which they are integrated. By providing methods and apparatus by which DSMs may communicate with each other, state-related aspects of a system that involve simultaneous participation of multiple electronic modules (e.g., multiple cores, a Northbridge, a Southbridge, a GPU, and so on) may be more accurately debugged. In various embodiments, the inter-communications made possible with the cross triggers enables the activities of the various DSMs to be tracked and coordinated across an entire system. Accordingly, the context of DSM activities across the entire system may be comprehended.

Before discussing the details of the various embodiments in detail, certain terminology is defined below to enhance understanding of the various embodiments. As used herein, a "DSM" refers to a discrete instantiation of debug circuitry (e.g., a state machine) that is integrated with an electronic module of a computing system, and which is configured to detect one or more "triggering events" and to perform one or more responsive "actions," where both the triggering events and the actions are events that occur in the context of debug operations for the computing system. A DSM is configured to provide visibility (e.g., to external test equipment, such as a Hardware Debug Tool (HDT)) to the electronic module's functionality. The term "integrated with," as used herein to describe the coupling between a DSM and an electronic module, means that the DSM is electrically and/or communicatively coupled with portions of the electronic module that enable the DSM to detect signals produced by the electronic module (and/or other portions of the computing system within which the electronic module is integrated). For example, but not by way of limitation, a DSM that is "integrated with" an electronic module may have access to one or more registers and/or other data storage locations within the electronic module, which enable the DSM to receive trace data that is produced and/or received by the electronic module while the electronic module is performing various operations (e.g., while the electronic module is executing software associated with a trace or test case). In an embodiment, observability of the trace data is provided to a DSM by way of a "debug bus," which provides an interface between portions of the electronic module and the DSM with which it is integrated. A DSM that is "integrated with" an electronic module is included on the same die as the electronic module, in an embodiment. The DSM may be included within the physical footprint of the electronic module or outside the physical footprint of the electronic module, in various embodiments.

As used herein, the term "triggering event" means an event detected by a DSM, which causes the DSM to take a particular action (e.g., based on a trigger-to-action mapping adhered to by the DSM). An "event" may be the receipt of a signal (or a combination of signals), the detection of a value (e.g., a register, clock or counter value) or another event that is detectable by the DSM, for example. Triggering events may be "internal" or "external." An "internal triggering event" means an event that is generated within the DSM itself, and which provides an impetus for the DSM to perform a responsive action. An "external triggering event" means an event that is generated or provided by a source external to the DSM (e.g., a debug bus, another DSM, and so on), and which also provides an impetus for the DSM to perform a responsive action. According to an embodiment, a particular type of external triggering event is a "cross trigger," which is a signal that is conveyed over one or more dedicated communication lines between DSMs (referred to herein as a "cross trigger bus"). "Cross triggering" is a term that is used herein to refer to communication methods and apparatus by which multiple DSMs of a computing system may communicate in order to coordinate their operations. "Pulse mode" cross triggering refers to communications between DSMs that includes one DSM providing a signal pulse on the cross trigger bus to indicate the occurrence of an event. In contrast, "level mode" cross triggering refers to a method by which signals asserted on the debug bus may be evaluated to determine when multiple DSMs (up to all DSMs) have detected a triggering event.

Similar to triggering events, actions also may be "internal" or "external." An "internal" action is initiated by a particular DSM in response to a triggering event, where the internal action has a direct effect within the DSM itself. For example, but not by way of limitation, an internal action may include the DSM performing a state transition, generating a signal that is consumed within the DSM itself, and updating a value in an internal register. In contrast, an "external" action means a signal that is generated by a DSM in response to an internal or external triggering event, where the external action is observable by other DSMs and/or other components of the computing system. For example, but not by way of limitation, an external action may include the DSM generating a cross trigger on the cross trigger bus. In addition to providing cross triggers for analysis by other DSMs, a DSM may perform the action of triggering external analysis equipment (e.g., an HDT). DSMs also, optionally, may externally "irritate" as triggering events are detected, where the term "irritate" may be defined as a DSM initiating or preventing events in logic external to the DSM.

As the above description indicates, a cross trigger is produced by a first DSM as an action in response to a triggering event, and the cross trigger may cause another DSM that receives it to perform a responsive action, as well. Accordingly, a cross trigger may be considered to be both a triggering event and an action, as those terms are defined herein. As will be described in more detail later, a DSM is programmable, and whether or not a particular instantiation of a DSM takes action in response to a triggering event depends on the programming of that DSM. In the case of cross triggers, for example, a DSM that receives a cross trigger generated by another DSM may or may not perform a responsive action, depending on its programming.

The computing system may be implemented on a single die, in an MCM, and/or as a plurality of discretely packaged devices (e.g., socketed devices disposed on one or more printed circuit boards (PCBs)). In an embodiment, DSMs that are integrated with multiple electronic modules of a single die communicate with each other over the cross trigger bus, which also is an integral part of the die. In other embodiments, discussed in more detail below, DSMs of different die of an MCM may communicate cross triggers between each other, and/or DSMs in devices installed in different sockets of a PCB (or multiple PCBs) may communicate cross triggers between each other.

FIG. 1 is a simplified block diagram of a computing system 100, in accordance with an example embodiment. It should be understood that FIG. 1 is a simplified representation of a computing system 100 for purposes of explanation and ease of description, and FIG. 1 is not intended to limit the subject matter in any way. Practical embodiments of the computing system 100 may include other devices and components for providing additional functions and features, and/or the computing system 100 may be part of a larger system, as will be understood. In other words, although a particular configuration of computing, memory, and other electrical components are depicted in FIG. 1, it is to be understood that the example configuration is intended to provide a framework for discussing embodiments of the inventive subject matter relating to cross triggering between DSMs. Accordingly, the example configuration is not intended to depict all components of a functional computing system, and the embodiments are not intended to be limited to implementation within a computing system having the configuration of FIG. 1.

Computing system 100 is contained on a motherboard 102 (a printed circuit board), which includes one or more sockets, busses, slots, connectors, and conductors (not illustrated) with which various computing, memory, and other electrical components of the system are physically, electrically, and/or communicatively coupled. More particularly, computing system 100 includes at least one microprocessor 110, 120, 130, one or more input/output (I/O) peripherals 140, and memory 150. Although computing system 100 may include a number of other system components (e.g., clocks, power supplies, other processing components, discrete electronics, and so on), such components are excluded from FIG. 1 and are not discussed herein for the purposes of clarity and simplicity.

The I/O peripherals 140 generally represent the hardware, software, and/or firmware components configured to support communications to/from the microprocessors 110, 120, 130 and one or more peripheral (or external) devices. For example, the I/O peripherals 140 may be realized as busses or other communications interfaces configured to support data transmission to/from the microprocessors 110, 120, 130 in accordance with one or more data communication protocols.

Memory 150 generally represents the main memory or primary memory for the computing system 100. Depending on the embodiment, memory 150 may be realized as a hard disk, flash memory, ROM memory, RAM memory, another suitable storage medium known in the art or any suitable combination thereof. Memory 150 maintains data and/or program instructions to support operations of the computing system 100 and/or microprocessors 110, 120, 130 as will be appreciated in the art. In an exemplary embodiment, memory 150 that is implemented separately from microprocessors 110, 120, 130 (e.g., on another chip and/or die) may be understood as being external to microprocessors 110, 120, 130.

Microprocessor 110 represents a discrete processing component that is implemented on a single die that is separately packaged from other system components, whereas microprocessors 120, 130 represent processing components that form portions of an MCM 160 (i.e., an electronic package that includes multiple die and/or other discrete components). Each of microprocessors 110, 120, 130 may include one or more DSMs 112, 122, 132, which communicate and coordinate operations through the implementation of cross triggering. Although later-described figures will discuss the concept of cross triggering within a "system on a chip" (SOC) in detail, the embodiment of FIG. 1 is intended to convey the concept that cross triggering also may be performed in conjunction with DSMs 112, 122, 132 that are located on different die within a same package (e.g., MCM 160) and/or on die within different packages.

As mentioned above, cross triggering may be implemented between DSMs on die within a same package (referred to herein as "die-to-die cross triggering"), in an embodiment. For example, cross triggering may be implemented between DSMs 122, 132 associated with microprocessors 120, 130 within MCM 160. In order to implement die-to-die cross triggering, cross triggers may be communicated between the DSMs 122, 132 via a Die-to-Die Communication Link (DDCL 162) or other communications interface between DSMs 122, 132. Die-to-die cross triggers may be communicated from one die to another using dedicated unidirectional pins, in an embodiment, where a DSM in one die drives a cross trigger signal on an output pin of the die, and another DSM on another die receives the cross trigger signal on an input pin of its respective die. In an alternate embodiment, die-to-die cross triggers may be communicated using dedicated bidirectional pins, where a first die both sends and receives cross triggers on the same pin(s), and the pin(s) are electrically connected to similar pins on a second die. In still another alternate embodiment, die-to-die cross triggers may be communicated using a communication protocol over an external bus, which interconnects the two dies.

In addition or alternatively, cross triggering may be implemented between DSMs on die within different packages (referred to herein as "socket-to-socket cross triggering"), in another embodiment. For example, cross triggering may be implemented between DSMs 112, 122 of microprocessors 110 and 120, which are housed in different packages. In order to implement socket-to-socket cross triggering, cross triggers may be communicated between the DSMs 112, 122 via a bi-directional, wired-OR configuration, in an embodiment. More particularly, certain package pins (e.g., pins controlled to implement a bi-directional mode) and socket-to-socket conductors (and other intervening circuitry) on the motherboard 102 (none of which are illustrated in FIG. 1) may be utilized as a communications interface to provide bi-directional communications between DSMs 112, 122 (i.e., from one socket to another). In an embodiment in which package pins are re-configured during testing to support cross triggering, no new package pins need to be added to support the cross triggering. Alternatively, DSMs 112, 122 may communicate socket-to-socket cross triggers via a packet-based communication technique (e.g., communications may be conducted over the HyperTransport (HT) fabric). Socket-to-socket cross trigger communications may be implemented over an existing communication bus within an existing communication protocol (e.g. an HT communication protocol) or socket-to-socket cross trigger communication may be implemented over a dedicated (e.g., special purpose) communication bus using a dedicated communication protocol. Socket-to-socket cross trigger communication packets may be communicated directly between sockets, or may be routed from socket to socket by intermediate electronic modules (e.g., buffer and/or routing chips) in the computing system.

Any one or more of microprocessors 110, 120, 130 may comprise an SOC, which includes a plurality of electronic modules, each of which includes at least one DSM. As indicated previously, the various DSMs of a computing system, including the various DSMs of an SOC, communicate and coordinate operations through the implementation of cross triggering (referred to herein as "intra-die cross triggering"). Embodiments of cross triggering performed in the context of an SOC will now be discussed in more detail.

Figure 2:
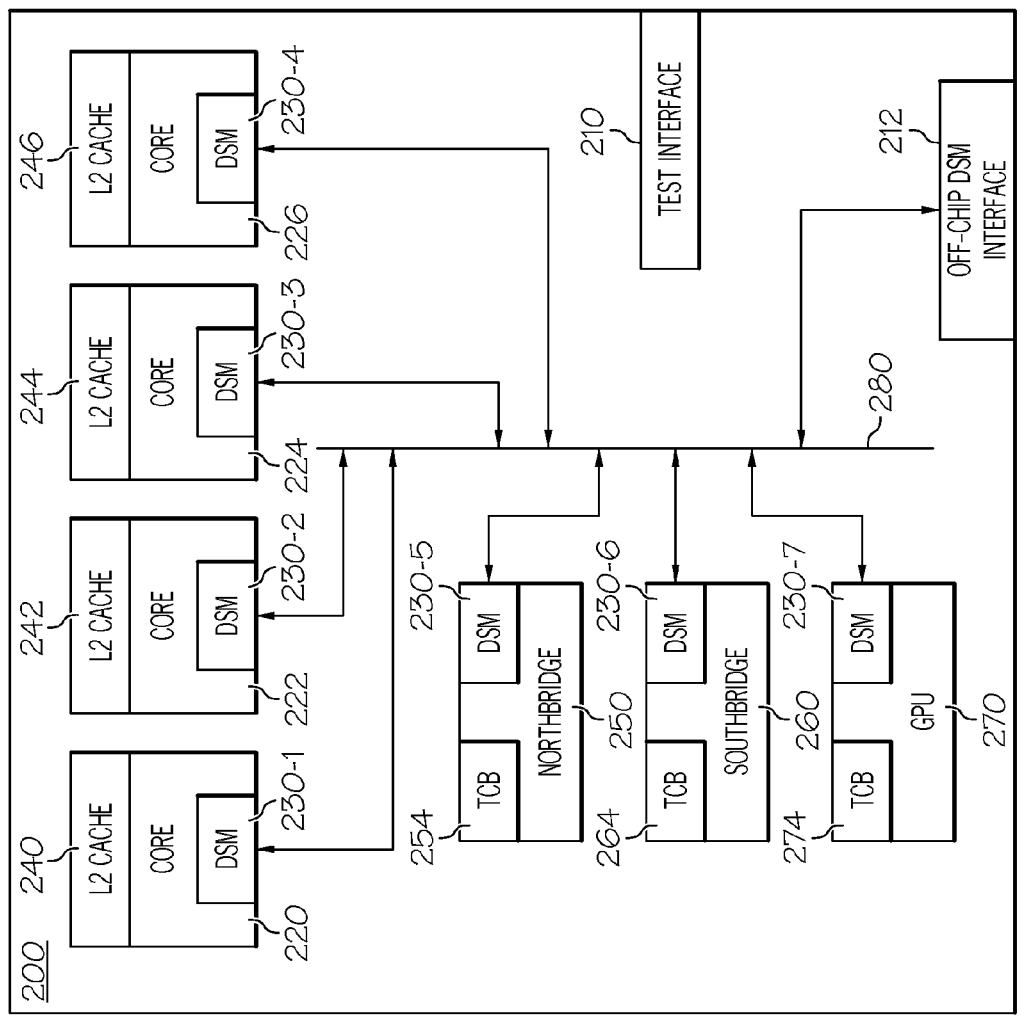
FIG. 2 is a block diagram of a system on a chip, in accordance with an embodiment.

FIG. 2 is a block diagram of an SOC 200, in accordance with an example embodiment. It should be understood that FIG. 2 is a simplified representation of an SOC 200 for purposes of explanation and ease of description, and FIG. 2 is not intended to limit the subject matter in any way. Practical embodiments of the SOC 200 may include other devices and components for providing additional functions and features, as will be understood.

In an exemplary embodiment, SOC 200 includes a plurality of processing cores 220, 222, 224, 226 (each with an integrated DSM 230-1, 230-2, 230-3, 230-4), a plurality of trace data storage elements 240, 242, 244, 246, 254, 264, 274 (e.g., L2 caches and Trace Cache Buffers (TCBs)), a Northbridge 250 (or memory controller) (with an integrated DSM 230-5), a Southbridge 260 (with an integrated DSM 230-6), a GPU 270 (with an integrated DSM 230-7), and a cross trigger bus 280. Cross triggering to DSMs (not illustrated) on other die within the same package (e.g., in an MCM) and/or other packages may be achieved via off-chip DSM interface 212. Although FIG. 2 depicts each of processing cores 220, 222, 224, 226, Northbridge 250, Southbridge 260, and GPU 270 as including an associated DSM 230-1, 230-2, 230-3, 230-4, 230-5, 230-6, 230-7 (collectively "230"), some of these electronic modules may not include a DSM. In such cases, the electronic module may, instead, simply port signals in and out, as they relate to debug operations, or some of these electronic modules may not support debug operations at all.

Although SOC 200 is illustrated as including four cores 220, 222, 224, 226, an SOC may include more or fewer cores, in other embodiments (including as few as one single core). In addition, although SOC 200 is illustrated as including a single Northbridge 250, Southbridge 260, and GPU 270, some or all of these electronic modules may be excluded from SOC 200 (e.g., they may be located off-chip), in other embodiments. Furthermore, although SOC 200 is illustrated as including only one Northbridge 250, an SOC may include more than one Northbridge, in other embodiments. Besides the processing components and busses illustrated in FIG. 2, an SOC may include additional or different processing components, busses, and other electronic devices and circuitry, in various embodiments.

Processing cores 220, 222, 224, 226 generally represent the main processing hardware, logic and/or circuitry for the SOC 200, and each processing core 220, 222, 224, 226 may be realized using one or more arithmetic logic units (ALUs), one or more floating point units (FPUs), one or more memory elements (e.g., one or more caches), discrete gate or transistor logic, discrete hardware components, or any combination thereof. Although not illustrated in FIG. 2, each processing core 220, 222, 224, 226 may implement its own associated cache memory element (e.g., a level one or L1 cache) in proximity to its respective processing circuitry for reduced latency.

Northbridge 250, which also may be referred to as a "memory controller," in some systems, is configured to interface with I/O peripherals (e.g., I/O peripherals 140, FIG. 1) and memory (e.g., memory 150, FIG. 1). Northbridge 250 controls communications between the components of SOC 200 and the I/O peripherals and/or external memory. Southbridge 260, which also may be referred to as an "I/O controller hub," in some systems, is configured to connect and control peripheral devices (e.g., relatively low speed peripheral devices). GPU 270 is a special purpose microprocessor, which offloads and accelerates graphics rendering from cores 220, 222, 224, 226.

In the illustrated embodiment, caches 240, 242, 244, 246 and TCBs 254, 264, 274 provide intermediary memory elements having reduced size relative to external memory for temporarily storing data and/or instructions retrieved from external memory or elsewhere, and/or data produced by processing cores 220, 222, 224, 226, Northbridge 250, Southbridge 260, and GPU 270. For example, in an embodiment, caches 240, 242, 244, 246 and TCBs 254, 264, 274 provide memory elements for storing debug information (or "trace data") collected and/or produced by DSMs 230 during debug operations associated with the respective electronic modules with which they are integrated. In the illustrated embodiment, caches 240, 242, 244, 246 are in close proximity to and coupled between a respective processing core 220, 222, 224, 226 and the Northbridge 250. In this regard, caches 240, 242, 244, 246 may alternatively be referred to as core-coupled caches, and each core-coupled cache 240, 242, 244, 246 maintains data and/or program instructions previously fetched from external memory that were either previously used by and/or are likely to be used by its associated processing core 220, 222, 224, 226. Caches 240, 242, 244, 246 are preferably larger than L1 caches implemented by the processing cores 220, 222, 224, 226 and function as level two caches (or L2 caches) in the memory hierarchy. SOC 200 also may include another higher level cache (e.g., a level three or L3 cache, not illustrated) that is preferably larger than the L2 caches 240, 242, 244, 246.

In an exemplary embodiment, the SOC 200 includes a test interface 210 that comprises a plurality of pins dedicated for use in testing and/or configuring the functionality of the SOC 200. In one embodiment, the test interface 210 is compliant with the IEEE 1149.1 Standard Test Access Port and Boundary-Scan Architecture, that is, the Joint Test Action Group (JTAG) standards. Although the interconnections are not specifically illustrated in FIG. 2, the DSMs 230 are coupled to the test interface 210 and receive signals and/or bits from the test interface 210 that establish (or "program") a configuration for each DSM 230. In response, each DSM 230 operates according to the programmed configuration. In this regard, in an exemplary embodiment, each of the DSMs 230 may be programmed to implement a customized version of a cross triggering process, as described in greater detail below.

Each DSM 230 may be configured (e.g., programmed) differently from the other DSMs 230 in SOC 200 and/or in other parts of a computing system. More particularly, a DSM 230 may be programmed by establishing values in various DSM registers, which essentially pre-select which triggering events a DSM 230 may take action in response to detecting, and also pre-select the corresponding actions. In addition, certain triggering events and actions may not be programmable (e.g., pre-selectable), and a DSM 230 may take a particular action in response to a particular triggering event regardless of any DSM programming that may have been performed. As used herein, the term "widget" refers to a software routine that is configured, when executed, to program a DSM in a particular way (e.g., to establish particular DSM register values, resulting in the pre-selection of triggers, state transitions, and actions). In other words, a "widget" may be considered a setup program for a DSM. As will be described in more detail later, a "widget" also may be defined as a machine-readable program that enables a DSM to perform a set of state transitions in response to detecting that pre-selected triggers were produced. As will be described in detail later, diagnostic software may be configured to coordinate the execution of a sequence of widgets in order to configure DSMs 230 in various manners that provide a desired system visibility. The diagnostic software may be executed on the computing system (e.g., computing system 100) in which the DSMs 230 are incorporated, or on external test equipment.

According to an embodiment, a DSM 230 of an embodiment may support one or more functions selected from a group consisting of: 1) trace start/stop; 2) trace filtering; 3) cross triggering between DSMs; 4) clock stopping; 5) triggering external analysis equipment (e.g., providing HDT interrupts); and 6) providing a flexible microcode interface. Some embodiments of the inventive subject matter relate to cross triggering between DSMs.

According to an embodiment, cross triggering is implemented via cross trigger bus 280. Cross trigger bus 280 includes one or more, bi-directional conductors, which provide for signaling communication between DSMs 230. According to a particular embodiment, cross trigger bus 280 includes four parallel conductors, although cross trigger bus 280 may include more or fewer conductors, in other embodiments. Cross trigger bus 280 may be considered to be a "communications interface" between DSMs 230.

In response to detecting the occurrence of a triggering event for which a DSM 230 automatically should respond or that the DSM 230 has been programmed to respond to (e.g., a "pre-select triggering event"), the DSM 230 performs a corresponding action, as mentioned previously. According to an embodiment, a trigger-to-action map may be programmed into the DSM 230, which instructs the DSM 230 as to which particular action to perform when it detects a particular triggering event. The types of triggering events to which a DSM 230 will respond, and the responsive actions that the DSM 230 will implement depend, at least in part, on the DSM's programming, as mentioned above. In addition, certain types of internal and external triggering events and certain types of internal and external actions may be commonly attributed to DSMs 230 that are integrated with particular types of electronic modules (e.g., DSMs 230-1 through 230-4 that are integrated with cores 220, 222, 224, 226 may take different actions in response to different triggering events from the actions taken in response to triggering events detected by a DSM 230-5 that is integrated with Northbridge 250). For example, but not by way of limitation, a DSM 230 may be programmed to take one or more actions in response to one or more triggering events as follows:

Internal triggering events: A DSM may internally generate and respond to one or more internal triggering events selected from a group consisting of, but not limited to: a counter matching a first value; a clock count matching a second value; trace data matching a third value; trace data exceeding a fourth value; debug data matching a fifth value; a debug bus bit having a pre-defined state; a debug bus bit transition occurring; a random event occurring (e.g., as determined based on seed, polynomial, match, and mask registers); and a flag being asserted.

External triggering events: A DSM may detect and respond to one or more external triggering events selected from a group consisting of, but not limited to: receiving one or more signals from one or more sources external to the first electronic module, wherein the one or more signals are selected from a group consisting of a cross trigger signal on the communications interface; a trap signal; a clock stop signal; an error signal; a performance monitor ("perfmon") signal or event; an interrupt; a breakpoint; a microcode-based trigger (e.g., breakpoints, performance monitors, interrupts, and error events); and a timer overflow.

Internal Actions: In response to a triggering event, a DSM may take one or more internal actions selected from a group consisting of, but not limited to: performing a state transition; clearing a clock counter; stopping a counter; incrementing a general purpose counter; toggling a state bit of a general purpose counter; clearing a general purpose counter; setting or clearing a flag; toggling a random number; and enabling a pseudo-random event generator that can be used as a triggering event source for the DSM.

External Actions (e.g., "irritator actions"): In response to a triggering event, a DSM may take one or more external actions selected from a group consisting of, but not limited to: generating a cross trigger signal on the communications interface (e.g., asserting a cross trigger on the cross trigger bus 280, a die-to-die cross trigger, or a socket-to-socket cross trigger); generating a core stop clock signal; generating a die-wide stop clock signal; generating a self refresh signal for a memory (e.g., memory 150, FIG. 1); generating a communication interface receive disable signal; generating a trace store signal; generating a machine check exception (MCE) signal; generating a debug event signal; triggering a debug microcode interrupt; setting and clearing various bits in a DSM microcode register to be read by microcode upon a debug microcode interrupt; starting storage of debug data to a state capture buffer (e.g., to a TCB and/or L2 cache); stopping storage of debug data to a state capture buffer; storing a clock count to a state capture buffer; and changing the size of a queue.

As mentioned above, one action that may be performed by the DSM 230 is for the DSM 230 to assert a cross trigger. According to an embodiment, a DSM 230 may assert a cross trigger by providing a signal pulse (e.g., a one-cycle signal pulse) on one of the cross trigger conductors of cross trigger bus 280. In this "pulse mode" of operation, every DSM 230 may see cross triggers that are asserted from every other DSM 230, although a DSM 230 that asserts a cross trigger does not observe or respond to its own cross trigger, in an embodiment.

According to another embodiment, a "level mode" of operation may be implemented, which enables the DSMs 230 to determine whether a particular triggering event has been observed by a group (up to and including all) of the DSMs 230. Both pulse and level modes of operation will be described in more detail below.

As described above, the DSMs 230 are integrated with different types of electronic modules, and some or all of the electronic modules may be working in different clock domains. According to the pulse mode embodiment implemented in SOC 200, a single, one-cycle pulse on a cross trigger conductor being driven from a DSM 230 in one clock domain will be viewed by all other DSMs 230 in all other clock domains as a one-cycle pulse in each of their respective clock domains. Accordingly, even with disparate clock domains, a one-cycle pulse in one domain will not result in zero or an arbitrary number of pulses in another domain. Because some of the clock domains may be significantly faster than other clock domains, however, the rate at which a DSM 230 associated with a relatively fast clock domain may issue consecutive (e.g., back-to-back) cross triggers may be controlled (e.g., slowed) to ensure that DSMs 230 in relatively slow clock domains will have time to detect a cross trigger before it is de-asserted and replaced by another cross trigger.

Figure 3:
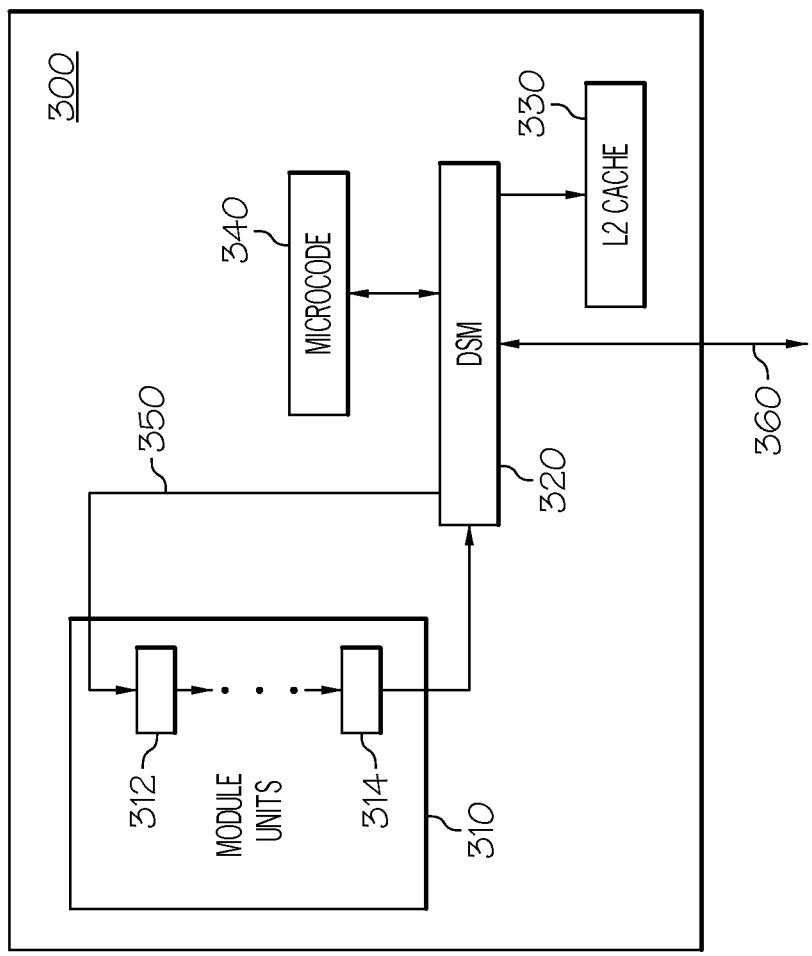
FIG. 3 is a block diagram of an electronic module with an integrated debug state machine, in accordance with an embodiment.

FIG. 3 is a block diagram of an electronic module 300 with an integrated DSM 320, in accordance with an embodiment. For example, electronic module 300 may be a processing core (e.g., one of cores 220, 222, 224, 226, FIG. 2), although electronic module 300 may be a different type of electronic module, as well. In an embodiment in which electronic module 300 is a processing core, DSM 320 may interface with microcode 340. This interface enables DSM 320 to observe the microcode being executed by the electronic module 300 and/or to modify execution of the microcode by the electronic module 300. In addition, as mentioned previously, DSM 320 may be capable of storing trace data in trace data storage (e.g., L2 cache 330), which includes information collected and/or produced by DSM 320 during execution of various operations performed by the electronic module 300.

Electronic module 300 also includes one or more "module units" 310, each of which may be configured to perform a set of actions or computations associated with the functionality of electronic module 300. DSM 320 is integrated with the various module units 310 by way of debug bus 350. Essentially, debug bus 350 functions as a conduit through which signals produced at various observability points 312, 314 within the module unit 310 may be conveyed to DSM 320. Although only two observability points 312, 314 are shown in FIG. 3, a multitude of observability points may be established along debug bus 350. At each observability point 312, 314, various multiplexing structures may funnel data onto the debug bus 350. Some or all of the signals received via debug bus 350 may be considered as triggering events by DSM 320, which may invoke DSM 320 to produce a cross trigger on a cross trigger bus 360, as described in more detail elsewhere, herein.

Figure 4:
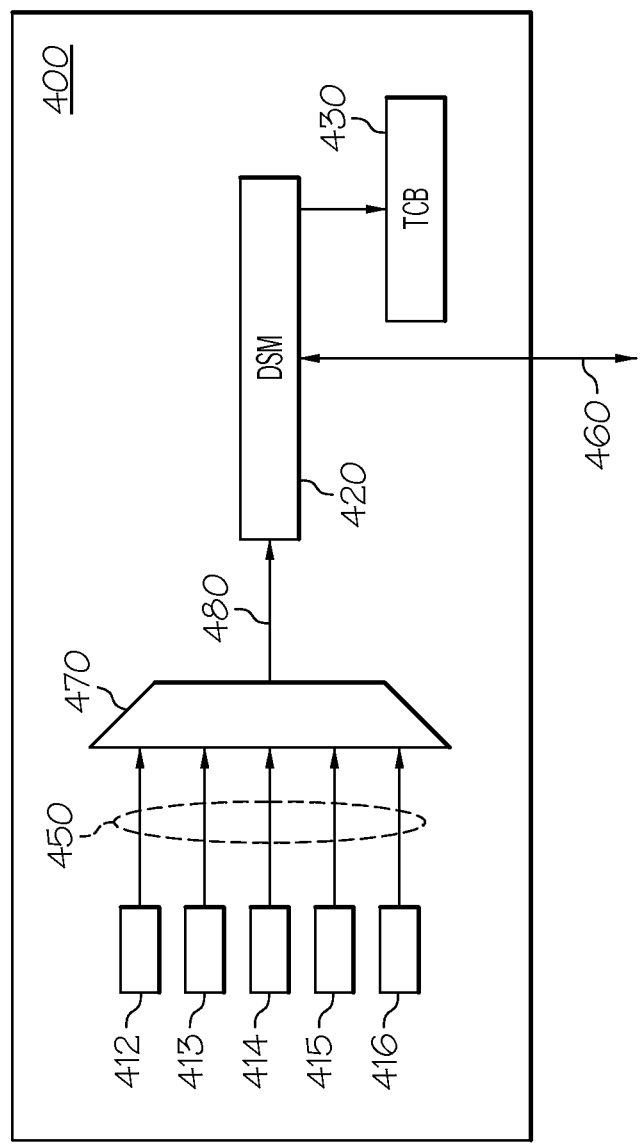
FIG. 4 is a block diagram of an electronic module with an integrated debug state machine, in accordance with another embodiment.

In an embodiment, debug bus 350 is configured as a ring bus, although a debug bus may be differently configured, as well (e.g., a debug bus may have a parallel structure, such as depicted in FIG. 4). In an embodiment, debug bus 350 is 64 bits wide, although debug bus 350 may be wider or narrower, in other embodiments. An advantage to the ring bus structure is that the structure may provide data from numerous observability points 312, 314 without the necessity for extensive parallel routing. However, the ring bus structure may have increased latency when compared with a parallel bus implementation, particularly for observability points (e.g., point 312) that occur earlier in the ring bus.

FIG. 4 is a block diagram of an electronic module 400 with an integrated DSM 420, in accordance with another embodiment. For example, electronic module 400 may be a Northbridge (e.g., Northbridge 254, FIG. 2), a Southbridge (e.g., Southbridge 264, FIG. 2), or a GPU (e.g., GPU 274, FIG. 2), although electronic module 400 may be a different type of electronic module, as well. In an embodiment, as mentioned previously, DSM 420 may be capable of storing trace data in trace data storage (e.g., TCB 430), which includes information collected and/or produced by DSM 420 during execution of various operations performed by the electronic module 400.

Figure 5:
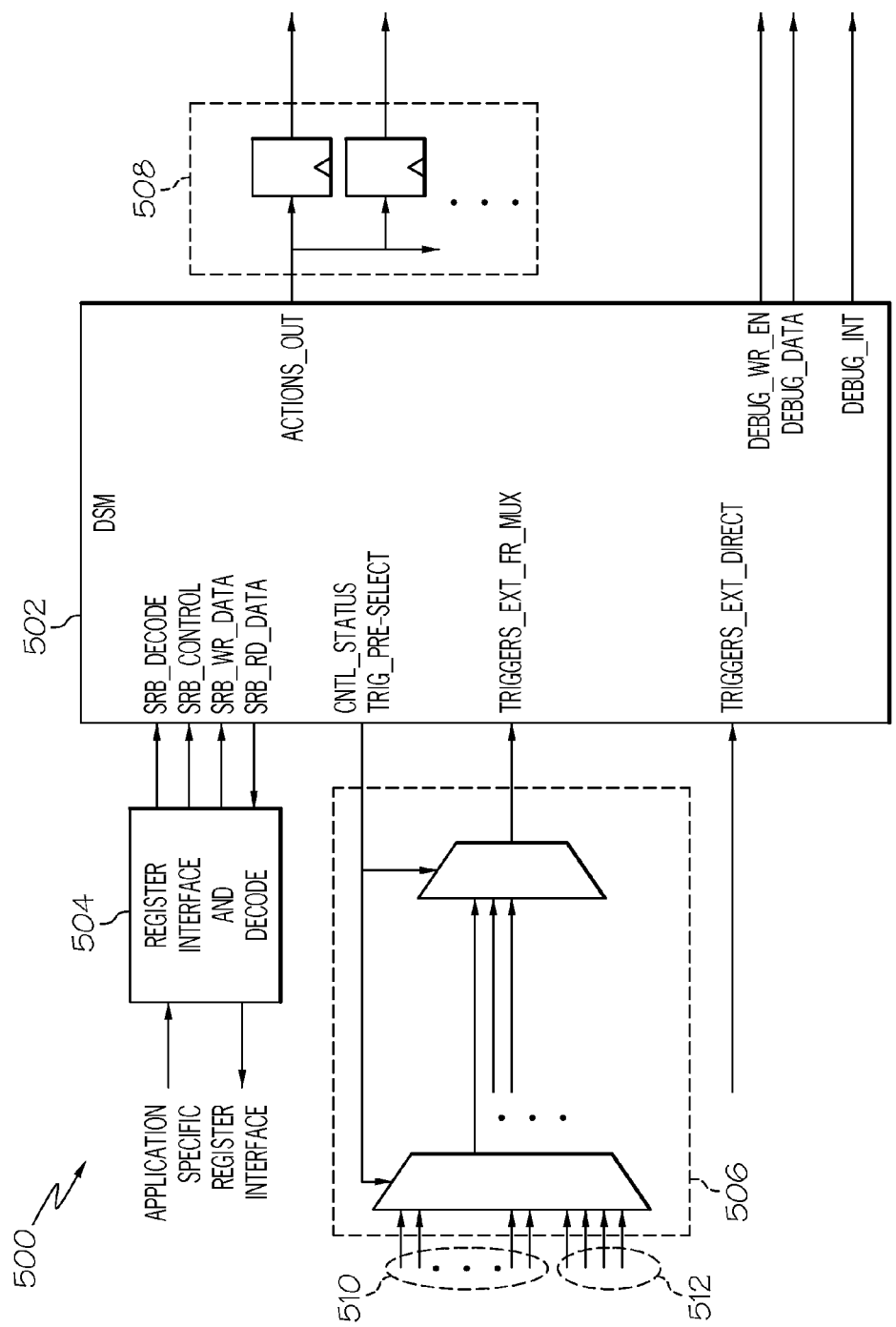
FIG. 5 is a conceptual block diagram of an application-specific wrapper for a debug state machine, which is suitable for use in the system of FIG. 2, in accordance with an embodiment.

DSM 420 is integrated with various observability points 412, 413, 414, 415, 416 of electronic module 400 by way of debug bus 450 and multiplexer (MUX) 470. Although MUX 470 is shown as a single multiplexer, MUX 470 may be implemented as a hierarchical structure in other embodiments (e.g., as depicted in FIG. 5, described below). Debug bus 450 and MUX 470 function as a conduit through which signals produced at the various observability points 412-416 within electronic module 400 may be conveyed to DSM 420. The output lines 480 from MUX 470 may be fed directly into DSM 420, in an embodiment. Although only five observability points 412-416 are shown in FIG. 4, a multitude of observability points may be established on debug bus 450. At each observability point 412-416, various multiplexing structures may funnel data onto the debug bus 450.

In the embodiment illustrated in FIG. 4, debug bus 450 is configured as a parallel bus. In an embodiment, debug bus 450 may have any number of parallel inputs to MUX 470, although only five are shown in FIG. 4, and the output lines 480 may be 64 bits wide. Alternatively, the output lines 480 may be wider or narrower, in other embodiments. Some or all of the signals received via output lines 480 may be considered as triggering events by DSM 420, which may invoke DSM 420 to produce a cross trigger on a cross trigger bus 460, as described in more detail elsewhere, herein. An advantage to the parallel bus structure is that the structure may provide reduced latency, when compared with the ring bus structure of FIG. 3. However, the parallel bus structure may warrant more extensive parallel routing, particularly when it is desirable to connect the debug bus 450 to numerous observability points.

The actual circuitry of a DSM may have any of a number of configurations that are suitable to facilitate the performance of debug operations within a system. Rather than describing a specific circuitry embodiment, a DSM "wrapper" will be described hereafter, which depicts an embodiment of the interfaces between a DSM and a computing system. More particularly, FIG. 5 is a conceptual block diagram of an application-specific DSM wrapper 500 for a DSM 502, which is suitable for use in the system of FIG. 2, in accordance with an embodiment. In conjunction with the various inputs and outputs to the DSM 502, the DSM wrapper 500 includes a register interface and decode logic 504, bus multiplexing (MUX) circuitry 506, and action gating circuitry 508.

The register interface and decode logic 504 provides an interface between the DSM 502 and one or more registers of the electronic module with which the DSM 502 is integrated. More particularly, DSM 502 is able to read values from and write values to selected electronic module registers via the register interface and decode logic 504. A decoding input ("SRB_DECODE") to DSM 502 includes a bus (e.g., a 40 bit bus) that facilitates decoding for each DSM register access. According to an embodiment, the decoding is performed within the DSM wrapper 500 such that each application may perform its own debug. A control input ("SRB_CONTROL") to DSM 502 controls reading from and writing to the internal DSM registers. From the SRB bus, a data input ("SRB_WR-DATA") includes a bus (e.g., a 32 bit bus) that facilitates writing of data from the SRB bus of the electronic module into the DSM 502. Conversely, a data output ("SRB_RD_DATA") includes a bus (e.g., a 32 bit bus) that facilitates writing of data from the DSM 502 onto the SRB bus of the electronic module. In this manner, data may be exchanged between the DSM 502 and the electronic module with which the DSM 502 is integrated.

During programming of the DSM 502 (e.g., during execution of a pre-defined widget by the computing system or by external test equipment to which a device-under-test is connected), values are written into various registers of the DSM 502, which specify to which triggering actions (or "triggers") the DSM 502 will respond, and the actions that the DSM 502 will take in response to those triggers (e.g., the written values define the trigger-to-action mapping). According to an embodiment, these registers include one or more control status ("CNTL_STATUS") and trigger pre-select ("TRIG_PRE-SELECT") registers. For example, in an embodiment, the trigger pre-select registers may include bits allocated to defining which triggers the DSM 502 will be capable of receiving (e.g., "pre-selected trigger bits"), bits allocated to defining permutations of the pre-selected trigger bits (e.g., "trigger permutation bits"), and bits allocated to specifying actions to be performed in response to detecting the pre-selected triggers or permutations of triggers (e.g., "action bits"). The trigger pre-select registers may be programmed with programming vectors (e.g., "metavectors"), which specify the triggers, trigger permutations, and actions to be performed. Once programmed, these registers may output control signals to bus MUX circuitry 506, which control which of a plurality of external signals (e.g., signals from debug bus 510 (e.g., debug bus 450, FIG. 4), cross trigger bus 512 (e.g., cross trigger bus 280, FIG. 2), or elsewhere) are permitted to pass through to a first external trigger input ("TRIGGERS_EXT_FR_MUX") to the DSM 502. Accordingly, the receipt and handling of the various triggering inputs is determined, in an embodiment, by the programmed values in the DSM control status and trigger pre-select registers.

According to an embodiment, each DSM also is capable of transitioning through a plurality of states, and accordingly, each DSM essentially may function as a state machine. In a particular embodiment, the current state of a DSM is indicated using one or more bits of the DSM control status register (or some other register). For example, two bits in the DSM control status register may be designated as DSM state bits, thus enabling the DSM to indicate that it is in any one of four different states. In other embodiments, more or fewer DSM state bits may be designated, thus supporting more or fewer states. In yet another embodiment, DSM state bits may be excluded altogether, and the DSM may not be capable of functioning as a state machine.

Figure 9:
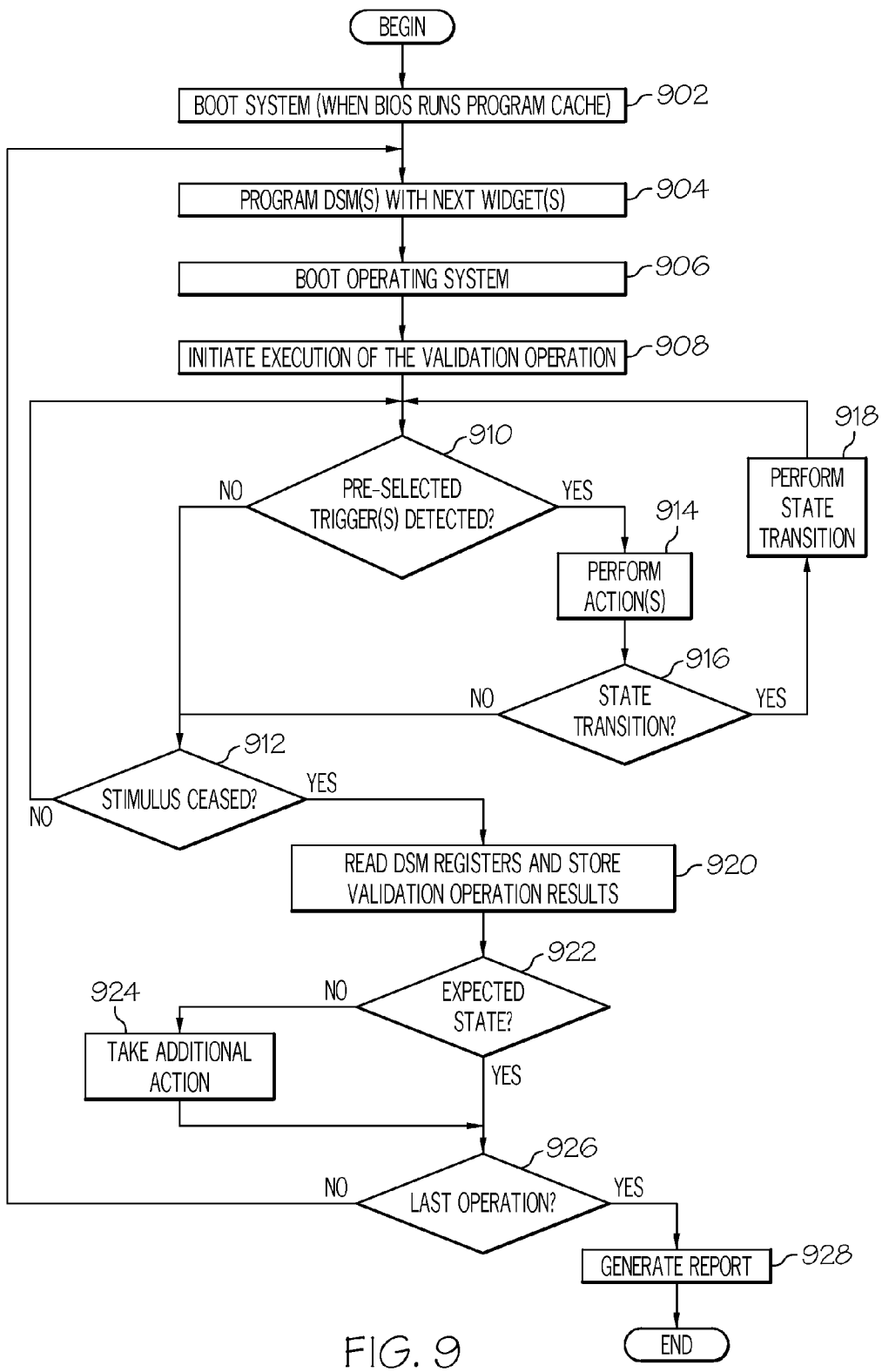
FIG. 9 is a flow diagram of a method for setting up and conducting an automated validation process, in accordance with an embodiment.

In embodiments in which DSM state bits are implemented, the current state of the DSM may be indicated by storing a value in the DSM state bits (e.g., "00" may correspond to state 1; "01" may correspond to state 2; "10" may correspond to state 3; and "11" may correspond to state 4). According to an embodiment, one type of defined action that the DSM 502 may take in response to detecting a set of pre-selected triggers is to perform a state transition. For example, a set of the action bits in the pre-selected trigger register(s) may be "go to state" bits, which indicate a next state that the DSM 502 should enter when the appropriate triggers are detected. When the "go to state" action is performed, the DSM 502 may modify the DSM state bits to indicate that it has entered the next state. In conjunction with any particular widget, a DSM 502 may be programmed to transition through any number of available states (or to stay in a single state), and to transition through states in or out of order. When execution of a widget is completed, the DSM state bits indicate the last state entered into by the DSM in conjunction with executing the widget. As will be described in more detail later in conjunction with FIG. 9, the DSM state bits may be accessed in order to make a determination of whether or not the DSM 502 is in a state that is expected upon completion of executing a particular widget. In other words, a widget may be designed to cause a DSM to transition through a sequence of states in response to detecting various triggers, and the DSM may be expected to be in a particular state when execution of the widget is completed. When a determination is made that the DSM did end up in the expected state, this may indicate that the DSM received the expected triggers during execution of the widget. Conversely, when a determination is made that the DSM did not end up in the expected state, this may indicate that the DSM did not receive the expected triggers during execution of the widget.

According to an embodiment, one or more trigger pre-select registers are allocated to each possible state of the DSM 502. For example, three trigger pre-select registers may be allocated to each of four possible DSM states, resulting in twelve total trigger pre-select registers. More or fewer trigger pre-select registers may be designated for each state, in other embodiments. Either way, different values may be written into the trigger pre-select registers allocated to each state, which enables DSM 502 to receive and respond to different triggers while in each of the different states, and which also enables DSM 502 to perform different actions in response to received triggers while in each of the different states.

Referring again to FIG. 5, although the parallel debug bus 510 and MUX circuitry 506 structure depicted in FIG. 5 is similar to the debug bus 450 and MUX structure 470 depicted and described in conjunction with FIG. 4, it is to be understood that the parallel debug bus 510 and MUX circuitry 506 combination may be replaced with a direct input from a debug bus, such as the ring type debug bus 350 depicted and described in conjunction with FIG. 3, in an alternate embodiment. In addition or alternatively, potentially triggering signals may be provided directly to a second external trigger input ("TRIGGERS_EXT_DIRECT") to the DSM 502. For example, but not by way of limitation, directly received triggers may include performance monitors, cross triggers, traps, breakpoints, and so on. Since these triggers are directly receivable, the programming of the control status and trigger pre-select registers do not affect their observability, in an embodiment.

As discussed previously, the DSM 502 may take any of a number of actions in response to detecting triggering events based on the various triggering inputs. According to an embodiment, the actions are implemented through one or more outputs ("ACTIONS_OUT") that are gated through action gating circuitry 508. The output signals produced by action gating circuitry 508 may be provided to any of a number of sub-modules of the electronic module with which the DSM 502 is integrated, as well as to other portions of the system outside of the electronic module (e.g., to various clock control circuits, DSM-to-microcode registers, or other electronic modules). In a particular embodiment, one or more outputs of the action gating circuitry 508 are connected to the cross trigger bus (e.g., cross trigger bus 280, FIG. 2), which enables the DSM 502 to generate cross triggers on any one or more conductors of the cross trigger bus. In addition, the DSM 502 may provide die-to-die cross triggers and socket-to-socket cross triggers via the action gating circuitry 508.

In an embodiment, DSM 502 may write data (referred to equivalently herein as "debug data" or "validation data") out to one or more data storage areas (e.g., to L2 cache 240, 242, 244, 246 and/or to TCB 254, 264, 274, FIG. 2), which are accessible to external test equipment, by asserting a write enable signal (via "DEBUG_WR_EN") and providing the data on data output lines (e.g., "DEBUG_DATA") from the DSM 502. The DSM 502 also may generate interrupts (e.g., microcode interrupts) via an interrupt output ("DEBUG_INT") from the DSM 502 to an interrupt input of another module or sub-module.

FIG. 6 is a flow diagram of a method for setting up and conducting debug operations, in accordance with an embodiment. The method may be performed, for example, in the systems of FIGS. 1 and/or 2, and/or in other suitably configured systems. The method may begin after a device under test (e.g., an integrated circuit, SOC, and/or electronic system) has been connected with appropriate external test equipment that is configured to cause the system to run through one or more test cases. In block 602, the system is booted (e.g., powered up), which includes executing the BIOS (basic input/output system) (e.g., loading the operating system, initializing the system, and so on). During execution of the BIOS, various storage locations for debug data may be configured (e.g., L2 caches 240, 242, 244, 246, FIG. 2).

In block 604, each of the DSMs that will be involved in the debug operation may be programmed using one or more widgets that may be executed (e.g., in conjunction with diagnostic software) by the computing system that includes the DSMs, or that may be executed by external test equipment. As discussed previously, each DSM may be programmed to respond to various triggering events by taking particular actions. More particularly, various registers of each DSM may be programmed to determine which external inputs may be multiplexed into the DSM as potentially triggering inputs, to indicate how DSM state transitions will be performed, and to establish a trigger-to-action mapping within the DSM. As part of this process, each DSM may be programmed to assert various cross trigger signals when particular triggering actions occur, to accept cross trigger signals as triggering inputs, and to perform particular actions when cross trigger signals are received.

According to an embodiment, the DSMs are programmed via the Special Register Bus (SRB). More particularly, while a DSM is in a programmable state, various registers of the DSM are programmed. The values within the programmable registers determine the triggering events to which the DSM will respond. In addition, the values within the programmable registers determine which actions the DSM will take in response to detecting a triggering event (i.e., the registers define a mapping of triggering events to actions), and how DSM state transitions will be performed in response to triggering events. According to a particular embodiment, the registers that determine the triggering events, the state transitions, and the responsive actions include the "CNTL_STATUS" and "TRIG_PRE-SELECT" registers previously discussed in conjunction with FIG. 3.

In block 606, the operating system is booted, and the test case may be executed in block 608. During execution of the test case, the DSM may store debug data (e.g., to L2 cache 240, 242, 244, 246 and/or to TCB 254, 264, 274, FIG. 2) that is provided to the DSM and/or generated by the DSM during execution of the test case. Debug data may be stored in any one or more of several modes, in an embodiment. For example, one mode involves storing selected debug data to the state capture buffer (e.g., to L2 cache 240, 242, 244, 246 and/or to TCB 254, 264, 274, FIG. 2). A second mode involves initiating the action of storing all debug data starting at a first time, and continuing until a subsequent action indicates that storing should be discontinued. According to an embodiment, upon any transition from storing to not storing, a timestamp value may be written out, which allows correlation of the data. In another embodiment, timestamp values may be written out at different times, and more or less frequently.

Execution of the test case may continue until it is completed or, in some cases, until it is interrupted (e.g., by the DSM in response to some triggering event). Upon completion or interruption of test case execution, the stored debug data and information indicating the DSM state may be accessed by external test equipment (e.g., from L2 cache 240, 242, 244, 246 and/or from TCB 254, 264, 274, FIG. 2). The method may then end.

FIG. 7 is a flow diagram of a method for operating debug circuitry in the context of a debug operation, in accordance with an embodiment. More particularly, the method of FIG. 7 corresponds to a subset of the operations performed by a DSM in block 608, FIG. 6. The operations, more specifically, correspond to the "pulse mode" of cross triggering, which was referred to above. The method may include at least two parallel actions. One parallel action that may be performed is that of exchanging trace data with the electronic module with which the DSM is integrated (e.g., via the "SRB_WR_DATA" and "SRB_RD_DATA" input/output discussed in conjunction with FIG. 5), and storing the trace data and/or other data generated by the DSM as debug data (e.g., to cache 240, 242, 244, 246 and/or from TCB 254, 264, 274, FIG. 2), in block 702. These processes may continue throughout execution of the test case.

In addition, another parallel action that may be performed includes detecting externally-originated triggering events (e.g., triggering actions based on external signals) and/or generating internal triggering events, in block 704. According to an embodiment, one type of externally-originated triggering event is the assertion of a cross trigger by another DSM of the system, as discussed previously. When an external or internal triggering event has occurred and has been detected by the DSM, the DSM may determine a responsive action to perform (e.g., the DSM may map the trigger to an action), in block 706. The DSM may then perform the action, in block 708. As discussed previously, one type of action that the DSM may perform includes the DSM asserting a cross trigger. The method may then iterate as shown, until execution of the test case is either completed or interrupted. It is to be understood that the DSM may perform a variety of additional computational and evaluative processes in conjunction with the execution of a particular test case, and that FIG. 7 is a simplified flow chart intended to highlight embodiments relating to pulse mode cross triggering between DSMs.

Figure 8:
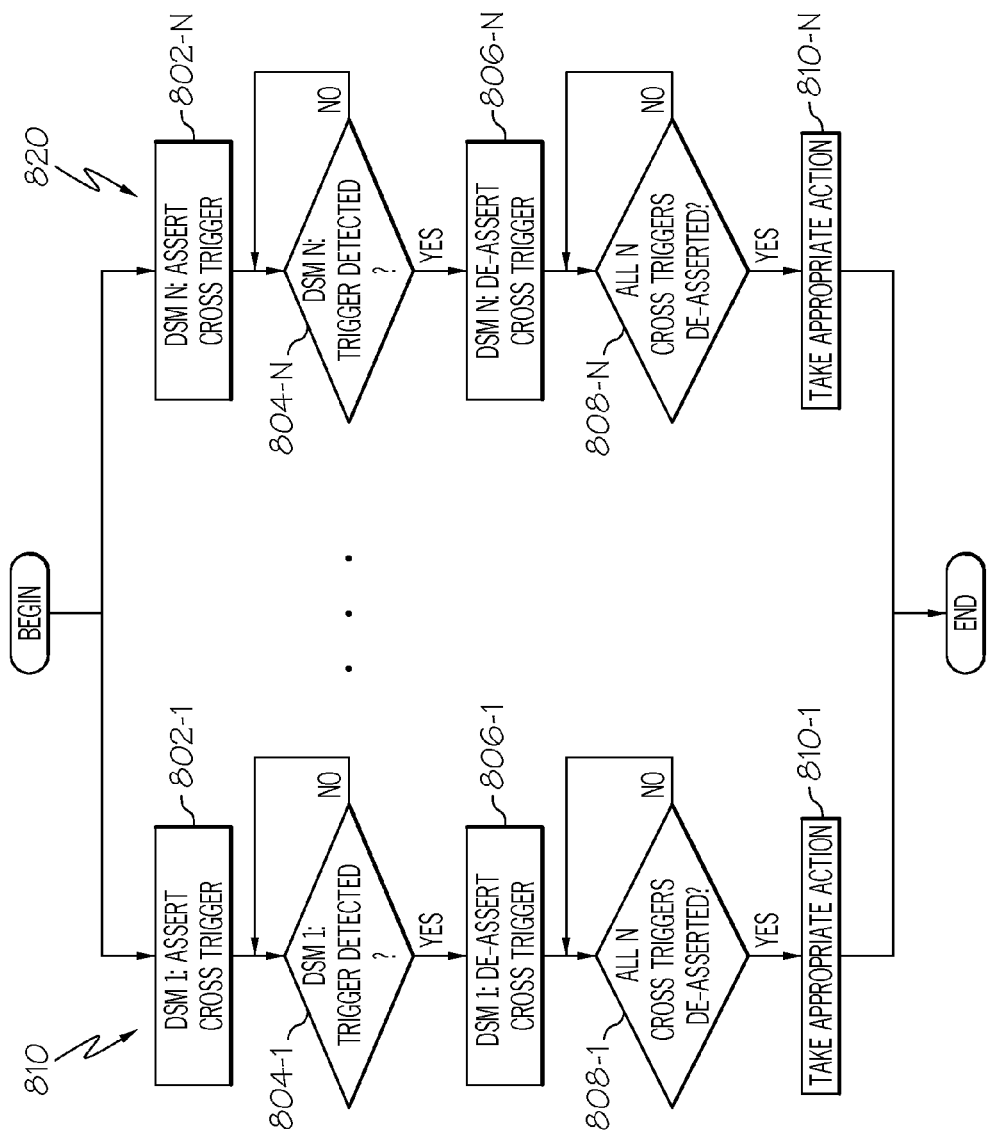
FIG. 8 is a flow diagram of a method for operating debug circuitry in a level mode, in accordance with an embodiment.

FIG. 8 is a flow diagram of a method for operating debug circuitry in the context of a debug operation, in accordance with another embodiment. More particularly, the method of FIG. 8 corresponds to a subset of the operations performed by a plurality of DSMs in block 608, FIG. 6. The operations, more specifically, correspond to the "level mode" of cross triggering, which was referred to above. In an embodiment, level mode cross triggering is performed by DSMs that are integrated with processing cores (e.g., by DSMs 230-1, 230-2, 230-3, 230-4 that are integrated with processing cores 220, 222, 224, 226, FIG. 2). However, level mode cross triggering may be performed by DSMs that are integrated with electronic modules other than processing cores, as well.

Each DSM involved in the level mode cross triggering performs a sequence of events. Because the electronic modules with which each DSM is integrated may operate independently from the other electronic modules, the sequence of events performed by one DSM may be performed in parallel with the sequence of events performed by another DSM that is involved in the level mode cross triggering. Accordingly, in FIG. 8, a sequence of events 820-1 performed by "DSM 1" is shown to be performed in parallel with a sequence of events 820-N performed by "DSM N". Although parallel event sequences 820-1, 820-N are shown for only two DSMs (i.e., DSM 1 and DSM N), it is to be understood that more than two DSMs may participate in level mode cross triggering (e.g., N may be any integer greater than 1).

In block 802-1, 802-N (collectively 802), each DSM involved in a level mode cross triggering process produces a first cross trigger signal on the cross trigger bus. The first cross trigger signal indicates that the triggering event that the DSM is waiting to detect has not yet occurred. In an embodiment, each DSM involved in the process is assigned to a different conductor of the cross trigger bus, and each DSM produces the first cross trigger signal on the conductor to which it is assigned. Producing the first cross trigger signal may include, for example, asserting a signal on the cross trigger bus (e.g., establishing a relatively high voltage signal on a conductor of the cross trigger bus to which the DSM is assigned). In another embodiment, producing the first cross trigger signal may include de-asserting a signal on the cross trigger bus (e.g., establishing a relatively low voltage signal on a conductor of the cross trigger bus to which the DSM is assigned).

In block 804-1, 804-N (collectively 804), each DSM then determines whether a triggering event has occurred and/or been detected by the DSM (e.g., externally-originated triggering events or internal triggering events). In an embodiment, each DSM may determine whether the same type of triggering event has occurred. For example, the triggering event may be a particular configuration space access made by a driver with which a DSM is integrated, and each DSM may determine whether its corresponding driver has made the particular configuration space access. When it has, the DSM may determine that the triggering event has occurred. Alternatively, each DSM may await the occurrence of a different type of triggering event from the other DSMs. Either way, when the triggering event for which the DSM is awaiting has not occurred, the method iterates as shown. Because the electronics modules with which the DSMs are integrated may operate independently from each other, each DSM may detect the occurrence of a triggering event at a different time from the other DSMs. In addition, some DSMs may never detect the triggering event, which may indicate an error condition. Accordingly, although blocks 804 through 810 are indicated to occur in parallel, that is not to imply that corresponding blocks occur simultaneously (e.g., DSM 1 may detect a triggering event at a different time from DSM N, and accordingly, DSM 1 may perform subsequent blocks 806, 808, 810 at different times from DSM N).

Upon detecting that the triggering event for which a DSM was waiting has occurred, the DSM may produce a second cross trigger signal on the cross trigger bus, in block 806-1, 806-N (collectively 806). The second cross trigger signal indicates that the triggering event that the DSM has been waiting to detect has occurred. Producing the second cross trigger signal may include, for example, de-asserting the previously asserted signal on the cross trigger bus (e.g., establishing a relatively low voltage signal on a conductor of the cross trigger bus to which the DSM is assigned). In another embodiment, producing the first cross trigger signal may include asserting a signal on the cross trigger bus (e.g., establishing a relatively high voltage signal on a conductor of the cross trigger bus to which the DSM is assigned).

The DSM may then determine, in block 808-1, 808-N (collectively 808) whether all other DSMs involved in the level mode cross trigger operation have produced the second cross trigger signal on the cross trigger bus (e.g., whether all N DSMs have indicated that they have detected their respective triggering event). When the DSM determines that fewer than all other DSMs have produced the second cross trigger signal, the method may iterate as shown. When the DSM determines that all of the other DSMs have produced the second cross trigger signal, the DSM may determine and take an appropriate responsive action, in block 810-1, 810-N (collectively 810). For example, the DSM may map the trigger to an action, and then may then perform the action. The method may then end. It is to be understood that the DSM may perform a variety of additional computational and evaluative processes in conjunction with the execution of a particular test case, and that FIG. 8 is a simplified flow chart intended to highlight embodiments relating to level mode cross triggering between DSMs.

Although not shown in FIG. 8, each DSM also may perform a parallel action of exchanging trace data with the electronic module with which the DSM is integrated (e.g., via the "SRB_WR_DATA" and "SRB_RD_DATA" input/output discussed in conjunction with FIG. 5), and storing the trace data and/or other data generated by the DSM as debug data (e.g., to cache 240, 242, 244, 246 and/or from TCB 254, 264, 274, FIG. 2). These processes may continue throughout execution of the test case.

As the above description indicates, DSMs may provide significant added visibility to what is occurring in various electronic modules (e.g., processing cores, the Northbridge, the Southbridge, a GPU, a special purpose processor, and other hardware components). In various additional embodiments, the functionality of DSMs are leveraged to provide various capabilities, including but not limited to, performing automated validation, IC testing, bug work-arounds, and stopping various clocks on specific cycles, to name a few capabilities. Embodiments of each of these capabilities are described below.

One capability that may be provided using DSMs, in accordance with various embodiments, includes an automated validation capability. More particularly, the DSM architecture may be used to validate important states prior to deployment. An embodiment of automated validation involves using DSM and debug busses as a tool to assess coverage of which states the various state machines in the system have been through (e.g., which states the DSMs have been through).

In an embodiment, and as discussed previously, widgets may be written and executed to cause the DSMs to observe particular facets of the system. The widgets may be atomic in nature. For example, one widget may cause DSMs to produce information that enables the system or validation personnel to determine that a memory controller (e.g., a double data rate (DDR) memory controller) spent below a threshold number of clock cycles in a particular state when going through a precharge operation. Another widget may enable a DSM to determine that a particular state machine took an illegal arc. Yet another widget may enable a DSM to determine that a particular state machine spent more than a threshold number of clock cycles in a particular state (even if it did go through the correct arc). Each of these occurrences may represent error conditions, and various other widgets may be implemented to represent other error conditions.

According to an embodiment, along with programming one or more DSMs, a particular widget may be adapted to monitor and automatically log information indicating whether or not particular states were entered by a DSM and/or an electronic module with which the DSM is integrated, lengths of time in various states (e.g., numbers of clock cycles), and other conditions that may indicate problems. Widgets also may be designed to provide a given stimulus to the computing system (e.g., data, control signals, and so on), and to determine whether the stimulus caused the system to transition through particular states or to a particular state. When information from the system indicates that the system did not perform a particular state transition, a widget may cause additional or different stimulus to be provided to the computing system in order to attempt to cause the computing system to perform the state transition.

When proving out silicon, widgets simultaneously may be executed on multiple systems. In some situations, a particular benchmark may be run over and over, and each time the benchmark is run, a different set of widgets may be executed by the DSMs, where the new widgets may look for events or data that are different from events or data that were observed by previously executed widgets.

When an error condition is encountered, the widget automatically logs state information that may be subsequently analyzed (e.g., by external test equipment). With the logged state information, different error signatures may enable a determination of different buckets of failures, so that validation personnel can decide which cases should be further analyzed. In the overall context of the validation process, a scorecard may be maintained, which indicates all validation cases that have been covered (and which have not). In an embodiment, the validation process is "automated," in that diagnostic software executed on the computing device that includes the DSMs (or on external test equipment) automatically executes a pre-specified sequence of widgets and logs the results of the widget executions for later analysis (e.g., by the validation personnel).

FIG. 7 is a flow diagram of a method for setting up and conducting an automated validation process, in accordance with an embodiment. The method may be performed, for example, in the systems of FIGS. 1 and/or 2, and/or in other suitably configured systems. In some cases, the validation process may be performed for a single device under test (e.g., an integrated circuit, SOC, and/or electronic system). Alternatively, multiple devices may be tested in parallel using the same, similar, or different validation cases.

According to an embodiment, the validation process includes the performance of a sequence of validation operations (e.g., anywhere from one to thousands of operations), where each validation operation involves the execution of a set of one or more widgets. In conjunction with the widgets, and as discussed previously, one or more DSMs may be programmed (e.g., metavectors may be loaded into the DSMs' trigger pre-select registers), and particular stimulus may be provided to the device under test. As used herein, the term "validation process" means the performance of a sequence of validation operations, and the term "validation operation" means the execution of a particular set of one or more widgets and the provision of information associated with execution of those widgets.

In an embodiment, prior to the performance of a validation process, a plurality of widgets is developed, diagnostic software configured to implement the sequence of validation operations (e.g., the sequence of widget execution) is loaded onto the computing system (e.g., when the computing system performs the validation process) or onto external test equipment (when the external test equipment executes the diagnostic software), and the diagnostic software is initiated to begin execution of the sequence of validation operations. After initiation of the validation process, the system may be left to run on its own (e.g., over a course of hours or overnight), and the results of the validation process may be subsequently reviewed by a validation personnel.

Similar to previously-described processes discussed in conjunction with FIG. 6, in block 902, the method may begin when the system is booted (e.g., powered up), which includes executing the BIOS (basic input/output system) (e.g., loading the operating system, initializing the system, and so on). During execution of the BIOS, various storage locations for validation data may be configured (e.g., L2 caches 240, 242, 244, 246, FIG. 2).

In block 904, the diagnostic software programs each of the DSMs that will be involved in a validation operation in accordance with the widget being executed in conjunction with the validation operation. According to an embodiment, and as discussed in detail previously, each DSM may be programmed to respond to various triggering events by taking particular actions. More particularly, and as described previously, various registers of each DSM may be programmed to determine which external inputs may be multiplexed into the DSM as potentially triggering inputs, and to establish a trigger-to-action mapping within the DSM. As part of this process, each DSM may be programmed to assert various cross trigger signals when particular triggering actions occur, to accept cross trigger signals as triggering inputs, and to perform particular actions when cross trigger signals are received.

In block 906, the operating system is booted, and execution of the validation operation may be initiated in block 908. In conjunction with executing the validation operation, the diagnostic software provides (or causes the provision of) stimulus to the computing system. In addition, although not indicated in FIG. 9, DSMs may store validation data (e.g., to L2 cache 240, 242, 244, 246 and/or to TCB 254, 264, 274, FIG. 2) that is provided to the DSMs and/or generated by the DSMs during execution of the validation operation. Validation data may be stored in any one or more of several modes, in an embodiment (e.g., modes of storing debug data discussed previously in conjunction with FIG. 6).

Blocks 910-918 indicate certain processes that may be performed by a DSM during execution of a validation operation. It is to be understood that similar processes may be performed in parallel by other DSMs in the system, as well. In block 910, the DSM may determine whether a pre-selected trigger (or permutation of pre-selected triggers) has been detected. These triggers may include any of a number of previously described triggers. If the pre-selected trigger(s) have not been detected, then a determination may be made, in block 912, whether the stimulus provided in conjunction with the widget has ceased. If not, the method iterates as shown. If, in block 910, a DSM determines that the pre-selected trigger(s) have been detected, the DSM performs the appropriate action(s), in block 914. According to an embodiment, and as discussed previously in detail, one such action may be to perform a DSM state transition (e.g., as indicated by the "go to state" action bits in the pre-selected trigger register(s) for the current state, which indicate a next state that the DSM should enter when the appropriate triggers are detected). When a determination is made, in block 916, that an action to be performed is to perform such a DSM state transition, then the DSM performs the state transition, in block 918. As discussed previously, this may include the DSM setting or storing a value in the DSM state bits to indicate the next state to which the DSM is to transition. Essentially, by changing the setting of the DSM state bits to indicate the next state, the DSM is storing an indication of a state transition. The method then returns to block 910, in which the DSM attempts to detect the pre-selected trigger(s) corresponding to the next state (e.g., as indicated in the pre-selected trigger register(s) for that next state). When no state transition is to be performed, the system may continue to monitor whether the stimulus provided in conjunction with the widget has ceased, in block 912.

Eventually, the stimulation associated with the widget being executed will cease to be provided (or the operation otherwise may be interrupted). The diagnostic software may then access various ones of the DSM registers and/or the stored validation data (e.g., from L2 cache 240, 242, 244, 246 and/or from TCB 254, 264, 274, FIG. 2), in block 920. As discussed previously, DSM state bits may indicate the last state that a DSM was in when provision of the stimulus was ceased. In an embodiment, the diagnostic software may then determine whether the DSM state bits indicate that some or all of the DSMs were in "expected" states, in block 922. An "expected" state corresponds to a state that a DSM would be in if the DSM had performed each state transition that should have occurred during execution of the widget (e.g., the triggers for each of the DSM states were detected during execution of the widget, which resulted in a pre-planned sequence of state transitions that culminated in the DSM entering a final expected state). Accordingly, a value stored in the DSM state bits may be considered to be information indicating whether or not an expected set of state transitions was performed. By analyzing the value in the DSM state bits, the diagnostic software can determine whether the desired or expected sequence of state transitions was performed by the DSM. The diagnostic software may store (or "log") the value of the DSM state bits or some other indication of whether or not the expected state transitions occurred in conjunction with executing the widget. According to an embodiment, this information may be stored on a hard drive or in other memory of the computing system. Alternatively, the information may be stored externally to the computing system. When a determination is made that some or all of the DSMs are not in the expected states, additional action may be taken, in block 924. For example, but not by way of limitation, such additional action may be for the diagnostic software to re-execute the same widget with different stimulus, and/or to execute a different widget. At this point, the validation operation may be considered to be completed.

In block 926, a determination is made by the diagnostic software whether the completed validation operation was the last validation operation to be performed in conjunction with the validation process. If not, the diagnostic software initiates execution of a next widget, and the method iterates as shown. If so, the diagnostic software may initiate generation of a report, in block 928, for later analysis by validation personnel. Alternatively, the validation personnel may cause the computing system or external test equipment to generate the report or to display information indicating results of the validation process via interaction with a system interface. Validation process results may indicate, for example, widgets that resulted in expected and/or unexpected DSM state transitions, values or characteristics of validation data, and other information that may be useful to the validation personnel. The method may then end.

By using the DSM architecture to validate important states prior to deployment, hardware may be more thoroughly and quickly proved out after silicon is available but before shipping. In addition, because the DSMs provide much more direct observability of the functioning of the various system components, improved power and performance tuning may be achieved.

In the context of automated validation, use of the above-described widgets in conjunction with the DSM architecture enables tedious tasks that previously were performed by humans to be performed in an automated way. In addition, the widgets may be implemented on numerous computers simultaneously, thus achieving a more robust validation. With the added visibility that is achieved with the DSM architecture, coverage maps may be created more quickly and in a less human-resource intensive manner.

Another capability that may be provided using DSMs, in accordance with various embodiments, includes using DSM programming techniques in the context of test. In contrast with validation processes, which are intended to test the functionality of a computing system, test processes are intended to detect defects that are more likely attributable to manufacturing issues (e.g., broken conductors, etching defects, and so on). A test process may be designed to provide visibility into a very small portion of the system, for example (e.g., a relatively small section of logic). Accordingly, test personnel may have a relatively small vector set that they want to run, from which they want to get high coverage without allowing test escapes and other defects to go undetected.

Using DSMs to observe or monitor debug busses and other signals according to various embodiments, thousands of different signals across an electronic module and/or a computing system may be observable. As described in detail previously, DSMs may be programmed to monitor various signals (e.g., debug busses, cross-triggers, and so on). Accordingly, as test escapes are found in a test contact, the DSMs may be programmed to zero in on the hardware on which the test escapes are occurring. For example, when a particular test indicates that a test escape has occurred (e.g., a DSM has changed state in response to detecting certain pre-selected triggers), the DSM(s) may be reprogrammed to monitor a subset of the signals and/or different signals.

Although this may be considered to be similar to previously implemented functional signatures, test implementation using the DSMs may be performed after the computing system has been designed in silicon, and the test vectors may target specific hardware. By modifying how the DSMs are programmed, extra test coverage may be achieved precisely where needed even after the silicon design is essentially complete. When a coverage hole is discovered after the silicon design has been completed (e.g., when it may be impractical to implement a change in the silicon design), additional test coverage may be added using the DSMs. Accordingly, the test coverage may be tuned without having to change a silicon design.

Figure 10:
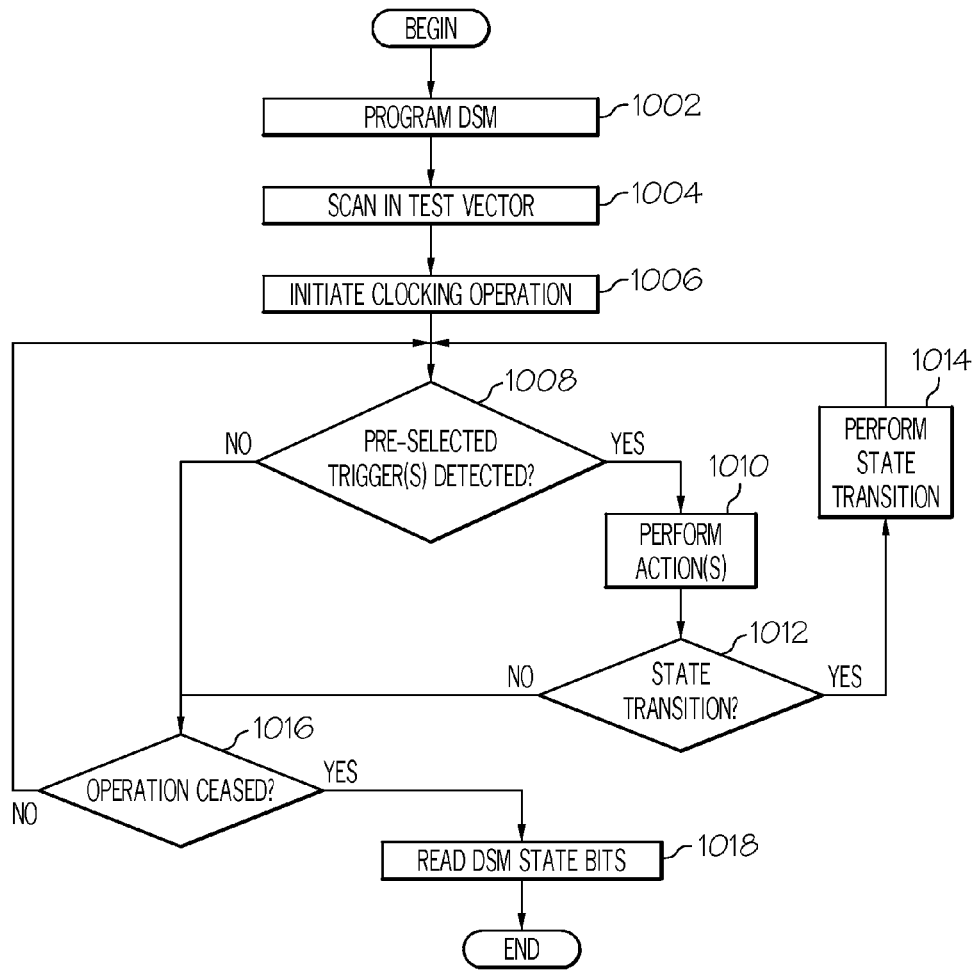
FIG. 10 is a flow diagram of a method for setting up and conducting a test process, in accordance with an embodiment.

FIG. 10 is a flow diagram of a method for setting up and conducting a test process, in accordance with an embodiment. The method may be performed, for example, in the systems of FIGS. 1 and/or 2, and/or in other suitably configured systems. The method may begin after a device under test (e.g., an integrated circuit, SOC, and/or electronic system) has been connected with appropriate external test equipment that is configured to cause the system to run through one or more test cases. According to an embodiment, the device under test is placed into a test socket that is configured to access scan ports, which in turn, provide access to on-chip scan channels. The scan channels enable some or all logic blocks (e.g., sets of flip-flops) of the computing system to be programmed with specific values.

The method begins, in block 1002, by programming a DSM that will be involved in the test operation (e.g., a DSM associated with a set of logic blocks being tested). DSM programming may be performed using one or more widgets being executed by the external test equipment, for example, or by otherwise writing values into the DSM control status and trigger pre-select registers. The DSMs may be programmed, for example, to detect triggers associated with a particular set of logic blocks being tested (e.g., a set of logic blocks associated with a possible test escape). For example, the logic being tested may be operatively coupled with the debug bus, and the DSM may be programmed to detect certain triggers associated with the debug bus. The DSM may be programmed to detect other types of triggers, as well (e.g., cross-triggers, and so on). The DSM may further be programmed to perform one or more actions (e.g., state transitions) when the pre-selected triggers are detected, in an embodiment.

In block 1004, values specified by the test vector are scanned into the set of logic blocks (e.g., via the test socket, scan ports, and scan channels). The values represent a stimulus applied to the computing system. In block 1006, the system may initiate a clocking operation, in order to allow the defect to present itself in the form of one or more triggers that are observable by the DSM.

During the clocking operation, the DSM may or may not detect the pre-selected trigger(s). When the DSM detects the pre-selected trigger(s), in block 1008, the DSM may perform one or more actions, in block 1010, according to its programming According to an embodiment, and as discussed previously in detail, one such action may be to perform a DSM state transition. When a determination is made, in block 1012, that a state transition is to be performed, the DSM may perform the state transition, in block 1014 (e.g., the DSM may set or store a value in the DSM state bits to indicate the next state to which the DSM is to transition). In addition to monitoring for pre-selected trigger(s) and performing actions in response, the DSM may store test data (e.g., to L2 cache 240, 242, 244, 246 and/or to TCB 254, 264, 274, FIG. 2) that is provided to the DSMs and/or generated by the DSMs during the clocking operation. The method may then iterate until a determination is made, in block 1016, that the clocking operation has ceased.

The DSM state bits and/or the stored test data may then be accessed, in block 1018. Access to the DSM state bits may be performed, for example, by scanning out the values of the DSM state bits using the scan channels, scan ports, and test socket. The DSM state bits may indicate the last state that a DSM was in when the clocking operation ceased. Test personnel may evaluate the DSM state information to determine whether the DSM detected the trigger(s) associated with the test process. The evaluation may provide the test personnel with information needed to zero in on the location and/or nature of a test escape. If needed, test personnel may execute one or more additional test processes (e.g., using different scan states and/or different DSM programming) in order to determine the location and/or nature of the test escape with precision. The method may then end.

In addition to validation and test, yet another capability that may be provided using DSMs, in accordance with various embodiments, includes providing bug work arounds. More particularly, the ability to program the DSMs also may be used as a work around for bugs. As used herein, a "DSM bug work around" means a programming state for a DSM that enables the DSM to take some action that avoids or mitigates errors that may be induced by a bug (herein "bug-induced errors") that is present in an electronic module. According to an embodiment, when a bug is identified (e.g., during validation or test) that may be avoided or mitigated by a DSM, the system BIOS is developed to include a function that will program the DSM in order to implement a bug work around. For example, assume that a bug exists in the CC6 hardware in a first version of silicon. Since CC6 involves power management, a significant amount of validation typically is done beyond the CC6 validation. According to an embodiment, a DSM may be programmed to respond to triggers that indicate when a bug-induced error is about to occur (or has occurred), and to produce a signal or interrupt that mitigates or avoids the bug-induced error. The ability to work around bugs through DSM programming enables validation to continue with the existing revision of silicon, rather than stopping forward progress and waiting for a new revision of silicon (e.g., months from when the bug is discovered). In some cases, such a workaround may be left in the silicon that is ultimately shipped.

Figure 11:
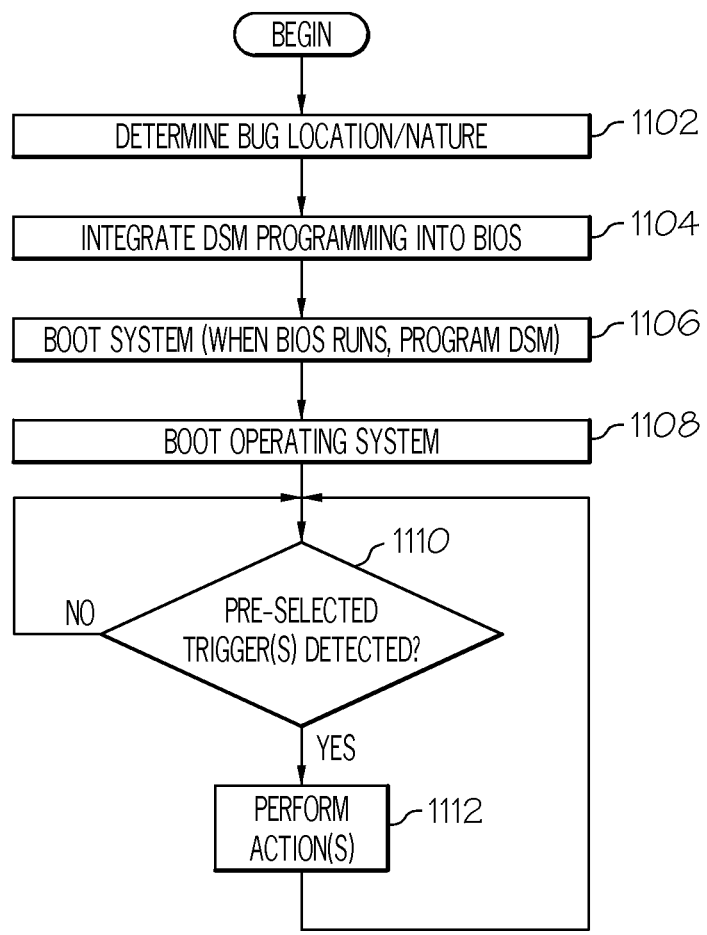
FIG. 11 is a flow diagram of a method for implementing a bug work around using a debug state machine, in accordance with an embodiment.

FIG. 11 is a flow diagram of a method for implementing a bug work around using a debug state machine, in accordance with an embodiment. The method may begin, in block 1102, by determining the location and/or nature of the bug (e.g., during validation or test), and thereafter determining whether the bug is of a type that a DSM could detect (e.g., through pre-selected triggers) and either mitigate or avoid (e.g., by DSM actions). When the DSM may be used to detect and mitigate/avoid bug-induced errors, DSM programming is developed and integrated into the BIOS of the system, in block 1104. The DSM programming enables the DSM to detect when a bug-induced error has, is likely to or will occur (e.g., via pre-selected triggers), and further enables the DSM to take a responsive action to avoid or mitigate the bug-induced error.

Once the capability to program the DSM is integrated into the BIOS, the DSM may be leveraged during operation of the computing system. Blocks 1106-1112 depict some of the functions that occur during operation. In block 1106, the system is booted (e.g., powered up), which includes executing the BIOS (basic input/output system) (e.g., loading the operating system, initializing the system, and so on). During execution of the BIOS, a DSM that will be involved in detecting a bug-induced error associated with the bug is programmed by the portion of the BIOS code that was developed for that purpose (e.g., in block 1104). According to an embodiment, and as discussed in detail previously, the DSM may be programmed to respond to various triggering events by taking particular actions. More particularly, and as described previously, various registers of the DSM may be programmed to determine which external inputs may be multiplexed into the DSM as potentially triggering inputs (e.g., inputs that indicate the occurrence or imminence of the bug-induced error), and to establish a trigger-to-action mapping within the DSM. As part of this process, the DSM may be programmed to perform particular actions when the pre-selected triggers are received.

In block 1108, the operating system is booted, and the system may begin operating. In block 1110, the DSM may determine whether a pre-selected trigger (or permutation of pre-selected triggers) has been detected. These triggers may include any of a number of previously described triggers. If the pre-selected trigger(s) have not been detected, then the method iterates as shown. If, in block 1110, the DSM determines that the pre-selected trigger(s) have been detected, the DSM performs the appropriate action(s), in block 1112.

As previously described, the DSM is capable of performing various categories of actions, including internal actions and external actions. External actions, also referred to herein as "irritator actions," may be selected to cause the electronic module with which a DSM is integrated to perform a function that it may not normally perform. For example, as discussed previously, external actions include generating a cross trigger signal; generating a core stop clock signal; generating a die-wide stop clock signal; generating a self refresh signal for a memory; generating a communication interface receive disable signal; generating a trace store signal; generating an MCE signal; generating a debug event signal; triggering a debug microcode interrupt; setting and clearing various bits in a DSM microcode register; and changing the size of a queue, among other things. The ability to perform these actions puts the DSM in a unique position, with respect to mitigating or avoiding certain types of bug-induced errors during operation. Several non-limiting use cases are described below.

One particularly useful action that a DSM may perform is to provide a microcode interrupt when a deadlock condition is imminent (e.g., a condition in which the microcode is unable to make instructional execution progress). "Deadlock" may be defined as a situation where system transaction requests and responses are prevented from making forward progress for some reason. Deadlock may occur, for example, when an instruction queue in the pipeline overflows, although deadlock may occur for other reasons, as well.

According to an embodiment, a DSM may be programmed to detect pre-selected triggers that indicate when an instruction queue in the pipeline is in danger of overflowing. As is known, the instruction pipeline includes various states (e.g., instruction fetch, decode, dispatch, execute, retire). Queues associated with the pipeline states temporarily store each instruction as it travels sequentially through the pipeline states. In some cases, a number of instructions in a queue may reach the maximum number of instructions that the queue is capable of storing, in which event system deadlock may occur. This scenario may be encountered, for example, when instruction progression through the pipeline is delayed by long latencies in loading data (e.g., from external memory or L2 to a nearby cache).

According to an embodiment, a DSM may be programmed with pre-selected triggers that indicate when an instruction queue overflow condition is imminent. Performance monitors (e.g., indicating instructions retired) and/or other triggers (e.g., queue pointers) may indicate such a condition, for example. The DSM may be further programmed to take the action of producing a microcode interrupt when such triggers are detected. The microcode interrupt may cause the portion of the pipeline that issues instructions to execute to stall, which enables other instructions to be flushed from the pipeline (e.g., retired). In this manner, the system may avoid queue overflow and a potential deadlock scenario. Once the potential overflow condition is alleviated (e.g., a sufficient number of instructions are retired), the microcode may resume.

Another useful action that a DSM may perform is to activate logic of an electronic system that is configured to prevent the system from encountering a livelock and/or a deadlock condition. Similar to the previously described embodiment relating to potential deadlock due to overflowing instruction queues, a DSM may be programmed to detect pre-selected triggers that indicate other scenarios in which livelock and/or deadlock may be imminent. For example, another example of a deadlock scenario is when the system is in a state in which transaction A is waiting on the result of transaction B, while transaction B is waiting on the result of transaction A. There is no progress or activity because both transactions are waiting. "Livelock" is similar to deadlock, in that livelock has the same end result (no progress). However, in a livelock scenario, instead of the system being completely halted, the state machines and queues in the system look like they are active. The system is effectively busy doing nothing.

According to an embodiment, a DSM may be programmed with pre-selected triggers that indicate when a livelock or deadlock condition is imminent. The DSM may be further programmed to take the action, when such triggers are detected, of invoking those portions of logic associated with avoiding livelock and/or deadlock situations to perform functions associated with avoiding the livelock and/or deadlock situation. In this manner, the system may avoid potential livelock and deadlock scenarios.

In various embodiments, a DSM may be programmed to provide system visibility (e.g., via the debug bus) that enables one or more livelock and/or deadlock scenarios to be detected, and to take action accordingly. For example, a DSM may be programmed to detect a stop in forward progress. More particularly, the DSM may be programmed to monitor a program counter (PC) or retired instruction pointer (RIP), which are generally good indicators of system progress. A pre-selected trigger may be a recognition, by the DSM, that the PC or RIP have not incremented within a number of cycles, and the DSM may take responsive action when this occurs. This may be used, for example, in the automated validation flow to indicate a general system failure, although it may be used in other situations, as well. As another example, a DSM may be programmed to detect that a deadlock or livelock condition is imminent (in addition to detecting overflowing instruction queues, as discussed previously). The DSM may be programmed to recognize system behavior (e.g., a sequence of control signals) that is known to cause a deadlock or livelock condition. Knowledge of the system behavior may be gathered by the DSM from traces of the debug bus through the DSM. Once the DSM recognizes the imminent deadlock or livelock system behavior, the DSM may take any of a number of actions, as a result, either to avoid the impending deadlock or livelock condition or to handle the situation in some other way.

Yet another capability that may be provided using DSMs during debug, validation, and test, in accordance with various embodiments, includes stopping various clocks with DSMs, as mentioned previously. More specifically, another debug technique includes programming the DSMs to stop various clocks on specific cycles. With the increased visibility provided by the DSMs, intricate sequences of events interacting over the whole system may be observed. When a DSM is programmed to look for a particular sequence of events that is associated with an imminent deadlock scenario (e.g., a scenario that may be indicated by one or more pre-selected triggers), a DSM may perform the action of stopping one or more clocks (e.g., immediately or some other time before deadlock, which may occur thousands of clock cycles later). By stopping the clocks rapidly upon detection of an imminent deadlock situation, information may be determined regarding the state of the electronic system at a time proximate to the time when the sequence of events occurred (e.g., by accessing data stored in L2, memory or other data storage, and/or by scanning out the values of various registers (e.g., including the DSM state bits) and other logic using the scan channels and scan ports). If the clocks were not stopped, as indicated earlier, hundreds or thousands of clock cycles may occur before the system enters deadlock, and the information regarding the state of the system at the time proximate to the sequence of events may be lost.

Figure 12:
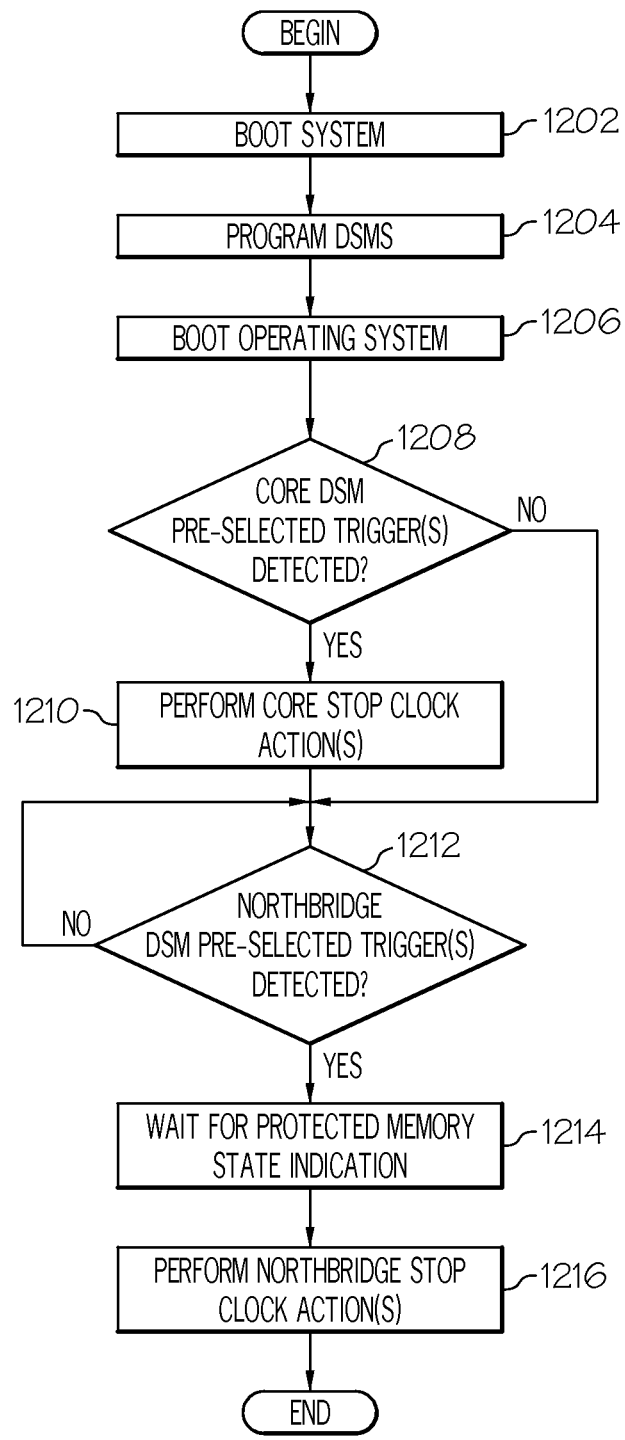
FIG. 12 is a flow diagram of a method for performing a stop clock operation using one or more debug state machines, in accordance with an embodiment.

FIG. 12 is a flow diagram of a method for performing a stop clock operation using one or more debug state machines, in accordance with an embodiment. Various embodiments of the method may be performed in a computing system that includes a single clock or a plurality of clocks that operate in a hierarchical or other related manner. In the hierarchical clock configuration, one or more clocks associated with a first electronic module (e.g., "master" clocks associated with Northbridge 250, FIG. 2) typically control one or more additional clocks associated with one or more additional electronic modules (e.g., "slave" clocks associated with cores 220-226, FIG. 2). In the example embodiment described herein, a DSM associated with a core or a Northbridge is used to initiate a die-wide stop clock operation.

The method may begin, in block 1202, by booting the system, as described previously. In block 1204, the DSMs of one or more electronic modules of the system may be programmed to detect triggers that indicate a particular sequence of events (e.g., events that may signal that a deadlock is imminent, or some other sequence of events). In addition, the DSMs may be programmed to take actions associated with stopping clocks, in the event of detecting the pre-selected triggers. The operating system may then be booted in block 1206, as described previously.

In block 1208 (which may be performed in parallel with or after block 1212), a core DSM determines whether one or more pre-selected triggers associated with a stop clock operation have been detected. For example, but not by way of limitation, the pre-selected triggers may include the core DSM receiving triggers that indicate that a particular sequence of events has occurred in the core (e.g., events associated with an imminent deadlock scenario), or the core DSM receiving a cross-trigger from another DSM (e.g., a DSM associated with another core or the Northbridge).

When the core DSM has determined that the pre-selected triggers have been detected, the core DSM may perform one or more core stop clock actions in block 1210, according to the core DSM programming. For example, but not by way of limitation, the DSM may perform an action of generating a core stop clock signal (thus initiating stopping the core's clock(s)), sending a cross-trigger to DSMs of one or more other electronic modules (which may invoke those DSMs to stop their respective clocks), transmitting a signal over a core-to-Northbridge interface to cause the Northbridge to initiate a die-wide stop clock operation (e.g., via a die-wide stop clock signal), and/or generating a self refresh signal for a memory. According to one embodiment, the core DSM may perform the action of stopping the core's clock(s) immediately upon detecting the pre-selected triggers. In another embodiment, the core DSM may not immediately stop the core's clock(s), but instead may wait for the Northbridge to invoke a die-wide stop clock operation, as described below.

In block 1212 (which may be performed in parallel with or before block 1208, as mentioned above), a Northbridge DSM determines whether one or more pre-selected triggers associated with a stop clock operation have been detected. For example, but not by way of limitation, the pre-selected triggers may include the Northbridge DSM receiving triggers that indicate that a particular sequence of events has occurred in the Northbridge, or the Northbridge DSM receiving a cross-trigger from another DSM (e.g., a DSM associated with a core). Alternatively, other portions of the Northbridge may determine whether a signal has been received over a core-to-Northbridge interface to request that the Northbridge initiate a die-wide stop clock operation.

When the Northbridge DSM has determined that the pre-selected triggers have been detected (or the Northbridge has received the stop clock request over the core-to-Northbridge interface), the Northbridge optionally may wait, in block 1214, until the Northbridge receives an indication that memory has been placed into a protected state (e.g., a "self-refresh" state). Alternatively, block 1214 may be bypassed.

In block 1216, the Northbridge may perform one or more die-wide stop clock actions. The stop clock actions may be performed by the Northbridge DSM, in an embodiment, or by other portions of the Northbridge, in other embodiments. Actions performed by the Northbridge DSM are discussed below, although the discussion is not meant to be limiting. According to an embodiment, when the Northbridge DSM has determined that the pre-selected triggers have been detected corresponding to a die-wide stop clock operation, the Northbridge DSM may perform the die-wide stop clock actions in block 1216, according to the Northbridge DSM programming. For example, but not by way of limitation, the Northbridge DSM may perform an action of stopping the Northbridge's clock(s) (thus causing the other slave clocks to stop), sending a cross-trigger to DSMs of one or more other electronic modules (e.g., sending the cross-trigger to the core DSMs, which may invoke the core DSMs to stop their respective clocks), transmitting signals over the core-to-Northbridge interfaces to cause the cores to initiate core stop clock operations (e.g., via a die-wide stop clock signal), and/or generating a self refresh signal for a memory. In this manner, the DSMs may be utilized to perform both local and die-wide stop clock operations. By enabling the stop clock operations to be performed prior to deadlock, state information relating to the conditions that prompted the stop clock operations may be maintained for further analysis.

Embodiments of various computing systems and methods for performing validation and other operations thereon have now been described. An embodiment includes a method for performing validation operations of a computing system that includes an electronic module and a debug circuit. The method includes executing a first program that enables the debug circuit to perform a first set of state transitions in response to detecting that one or more first pre-selected triggers have been produced by the computing system, and logging information indicating whether or not the first set of state transitions were performed.

In a further embodiment, executing the first program further includes monitoring a number of clock cycles that the debug circuit is in a particular state. In another further embodiment, the first program is configured to perform a function selected from a group consisting of determining that a memory controller spent fewer than a first threshold number of clock cycles in a particular state when going through a precharge operation, determining that a particular state machine took an illegal arc, determining that a particular state machine spent more than a second threshold number of clock cycles in a particular state, and determining whether the electronic module encountered an error condition. In yet another further embodiment, the method also includes accessing state bits in the debug circuit, which indicate a current state of the debug circuit, and analyzing the state bits to determine whether or not the first set of state transitions was performed. In yet another further embodiment, a trigger of the one or more pre-selected triggers includes a cross trigger signal received on a communications interface between the debug circuit and another debug circuit.

In yet another further embodiment, the first program includes a widget which, when executed, programs the debug circuit to detect the one or more first pre-selected triggers, and to perform at least one of the state transitions in response to detecting the one or more first pre-selected triggers. In yet another further embodiment, the method also includes executing a second program that enables the debug circuit to perform a second set of state transitions in response to detecting that one or more second pre-selected triggers were produced by the computing system, and logging additional information indicating whether or not the second set of state transitions were performed.

Another embodiment includes a method performed in a computing system that includes an electronic module and a debug circuit. The method includes the debug circuit detecting a set of pre-selected triggers produced by the computing system, the debug circuit performing a transition from a current state to a next state in response to detecting the set of pre-selected triggers, and the debug circuit storing an indication of the transition.

In a further embodiment, performing the state transition includes determining the next state from a first set of register bits, and storing the indication of the transition by storing an indication of the next state in a second set of register bits. In yet another further embodiment, the method includes accessing the second set of register bits, and determining whether the indication stored in the second set of register bits indicates that the debug circuit transitioned to an expected state. In yet another further embodiment, the method includes executing a program that enables the debug circuit to detect the set of pre-selected triggers, and logging an indication of whether or not the debug circuit transitioned to the expected state. In yet another further embodiment, the method includes, prior to the debug circuit detecting the set of pre-selected triggers, scanning values specified by a test vector into a set of logic blocks of the electronic module, and initiating a clocking operation of the electronic module. In yet another further embodiment, detecting the set of pre-selected triggers corresponds to determining that a test escape has occurred.

Another embodiment includes a method for performing test operations in a computing system that includes an electronic module and a debug circuit. The method includes programming the debug circuit to monitor various signals from the electronic module, determining, from the various signals, whether a test escape has occurred, and monitoring a subset of the various signals when the test escape has occurred.

Another embodiment includes a method for performing operations in a computing system that includes an electronic module and a debug circuit. The method includes programming the debug circuit to monitor for one or more pre-selected triggers produced by the computing system, and to perform one or more actions in response to detecting the one or more pre-selected triggers, the debug circuit detecting the one or more pre-selected triggers, and the debug circuit performing the one or more actions in response to detecting the one or more pre-selected triggers.

In a further embodiment, the one or more pre-selected triggers correspond to triggers that indicate that a bug-induced error associated with a bug of the computing system has, is likely to or will occur. In another further embodiment, the bug exists in CC6 hardware of the computing system, and programming the debug circuit corresponds to a work around for the bug in the CC6 hardware. In yet another further embodiment, the one or more pre-selected triggers correspond to triggers that indicate that a deadlock condition is imminent, and the one or more actions include producing a microcode interrupt. In yet another further embodiment, the one or more pre-selected triggers include performance monitors. In yet another further embodiment, the one or more actions are selected from a group consisting of generating a cross trigger signal, generating a core stop clock signal, generating a die-wide stop clock signal, generating a self refresh signal for a memory, generating a communication interface receive disable signal, generating a trace store signal, generating an MCE signal, generating a debug event signal, triggering a debug microcode interrupt, setting and clearing various bits in a DSM microcode register, and changing the size of a queue. In yet another further embodiment, programming the debug circuit is performed by a basic input/output system (BIOS) of the computing system. In yet another further embodiment, programming the debug circuit is performed by external test equipment.

Another embodiment includes a method for performing operations in a computing system that includes an electronic module and a debug circuit. The method includes enabling the debug circuit to determine whether one or more pre-selected triggers have been produced by the computing system, and when the one or more pre-selected triggers have been produced, that causes the debug circuit to perform one or more actions that initiate stopping one or more clocks.

In a further embodiment, the one or more pre-selected triggers correspond to an occurrence of an event or a sequence of events. In another further embodiment, the method also includes the debug circuit detecting the one or more pre-selected triggers, and the debug circuit performing the one or more actions in response to detecting the one or more pre-selected triggers. In yet another further embodiment, performing the one or more actions includes generating a stop clock signal. In yet another further embodiment, performing the one or more actions includes generating a cross-trigger signal. In yet another further embodiment, performing the one or more actions includes generating a self-refresh signal for a memory. In yet another further embodiment, the debug circuit performs the one or more actions to initiate stopping the one or more clocks at a time before deadlock.

For the sake of brevity, conventional techniques related to integrated circuit design, caching, memory operations, memory controllers, and other functional aspects of the systems (and the individual operating components of the systems) have not been described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient and edifying road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing validation operations of a computing system that includes an electronic module and a debug circuit, the method comprising:
    executing a first program that configures the debug circuit to perform a first set of state transitions in response to detecting that one or more first pre-selected triggers have been produced by the computing system, the configuration comprising setting, in the debug circuit, both:
        a set of states; and
        transitions between states in the set of states that are to be made in response to detecting that corresponding pre-selected triggers have been produced by the computing system, the setting comprising setting a next state value indicating a corresponding state from the set of states to be transitioned to for each pre-selected trigger associated with each state;
    determining whether the first set of state transitions were performed; and
    storing information indicating whether the first set of state transitions were performed;
    wherein the first program is further configured to perform a function selected from a group consisting of: determining that a memory controller spent more than a first threshold number of clock cycles in a particular state when going through a precharge operation, determining that an illegal arc was taken in transitioning between states, determining that more than a second threshold number of clock cycles was spent in a particular state, and determining whether the electronic module encountered an error condition.

2. The method of claim 1, wherein executing the first program further comprises monitoring a number of clock cycles that the debug circuit is in a state.

3. The method of claim 1, further comprising:
    accessing state bits in the debug circuit that indicate a current state of the debug circuit; and
    analyzing the state bits to determine whether the first set of state transitions was performed.

4. The method of claim 1, wherein the first program comprises a routine which, when executed, programs the debug circuit to detect the one or more first pre-selected triggers, and to perform at least one of the state transitions in response to detecting the one or more first pre-selected triggers.

5. The method of claim 4, further comprising:
    executing a second program that enables the debug circuit to perform a second set of state transitions in response to detecting that one or more second pre-selected triggers were produced by the computing system; and
    logging additional information indicating whether the second set of state transitions were performed.

6. The method of claim 1, wherein a trigger of the one or more first pre-selected triggers includes a cross trigger signal received on a communications interface between the debug circuit and another debug circuit.

7. A method performed in a computing system that includes an electronic module and a debug circuit, the method comprising:
    the debug circuit detecting a set of pre-selected triggers produced by the computing system;

the debug circuit performing a transition from a current state to a next state in response to detecting the set of pre-selected triggers, wherein performing the transition comprises:
  determining the next state from a first set of register bits;
  storing an indication of the transition by storing an indication of the next state in a second set of register bits;
  accessing the second set of register bits; and
  determining whether the indication stored in the second set of register bits indicates that the debug circuit transitioned to an expected state.

8. The method of claim 7, further comprising:
executing a program that enables the debug circuit to detect the set of pre-selected triggers; and
logging an indication of whether the debug circuit transitioned to the expected state.

9. The method of claim 7, further comprising:
prior to the debug circuit detecting the set of pre-selected triggers, scanning values specified by a test vector into a set of logic blocks of the electronic module; and
initiating a clocking operation of the electronic module.

10. The method of claim 9, wherein detecting the set of pre-selected triggers corresponds to determining that a test escape has occurred.

11. A method for performing operations in a computing system that includes an electronic module and a debug circuit, the method comprising:
  programming the debug circuit to monitor for one or more pre-selected triggers produced by the computing system, and to perform one or more actions in response to detecting the one or more pre-selected triggers, wherein the one or more actions comprise transitions between states of a state machine based on corresponding pre-selected triggers;
  the debug circuit detecting the one or more pre-selected triggers;
  the debug circuit performing the one or more actions in response to detecting the one or more pre-selected triggers, the actions comprising performing corresponding transitions between states of the state machine; and
  the debug circuit determining whether the transitions between states of the state machine resulted in an expected state of the state machine.

12. The method of claim 11, wherein the one or more pre-selected triggers correspond to triggers that indicate that a deadlock condition is imminent, and the one or more actions include producing a microcode interrupt.

13. The method of claim 12, wherein the one or more pre-selected triggers include performance monitors.

14. The method of claim 11, wherein the one or more actions are selected from a group consisting of generating a cross trigger signal, generating a core stop clock signal, generating a die-wide stop clock signal, generating a self refresh signal for a memory, generating a communication interface receive disable signal, generating a trace store signal, generating a machine check exception signal, generating a debug event signal, triggering a debug microcode interrupt, setting and clearing various bits in a microcode register, and changing the size of a queue.

15. The method of claim 11, wherein programming the debug circuit is performed by a basic input/output system (BIOS) of the computing system.

16. The method of claim 11, wherein programming the debug circuit is performed by external test equipment.

17. The method of claim 11, wherein the one or more pre-selected triggers indicate that an error associated with a bug in the computing system has, is likely to, or will occur.

18. A method for performing operations in a computing system that includes an electronic module and a debug circuit, the method comprising:
  enabling the debug circuit to determine whether a plurality of preselected triggers that indicate a particular sequence of events have been produced by the computing system, wherein the plurality of preselected triggers further indicate that an error associated with a bug in the computing system has, is likely to, or will occur; and
  when the plurality of pre-selected triggers have been produced, causing the debug circuit to perform one or more actions that initiate stopping one or more clocks, the one or more actions comprising one or more of: generating a stop clock signal, generating a cross-trigger signal, generating a self-refresh signal for a memory, and initiating stopping the one or more clocks at a time before deadlock.

19. The method of claim 18, further comprising:
the debug circuit detecting the plurality of pre-selected triggers that indicate a particular sequence of events; and
the debug circuit performing the one or more actions in response to detecting the plurality of pre-selected triggers.

* * * * *